(12) United States Patent
Song et al.

(10) Patent No.: US 11,509,128 B2
(45) Date of Patent: Nov. 22, 2022

(54) MULTI-PORT SOLID-STATE CIRCUIT BREAKER APPARATUSES, SYSTEMS, AND METHODS

(71) Applicant: ABB Schweiz AG, Baden (CH)

(72) Inventors: Xiaoqing Song, Apex, NC (US); Taosha Jiang, Cary, NC (US); Antonello Antoniazzi, Milan (IT)

(73) Assignee: ABB SCHWEIZ AG, Baden (CH)

( * ) Notice: Subject to any disclaimer, the term of this patent is extended or adjusted under 35 U.S.C. 154(b) by 248 days.

(21) Appl. No.: 17/019,590

(22) Filed: Sep. 14, 2020

(65) Prior Publication Data

US 2022/0085595 A1    Mar. 17, 2022

(51) Int. Cl.
  *H02H 9/00*    (2006.01)
  *H02H 3/08*    (2006.01)
  *H02H 1/00*    (2006.01)

(52) U.S. Cl.
  CPC ............ *H02H 3/08* (2013.01); *H02H 1/0007* (2013.01); *H02H 9/005* (2013.01)

(58) Field of Classification Search
  None
  See application file for complete search history.

(56) References Cited

U.S. PATENT DOCUMENTS

| | | | |
|---|---|---|---|
| 3,369,154 A | 2/1968 | Swain | |
| 3,745,896 A | 7/1973 | Sperti | |
| 4,068,283 A | 1/1978 | Russell | |
| 4,256,972 A | 3/1981 | Wyatt | |
| 4,713,720 A | 12/1987 | Rogers | |
| 4,725,911 A | 2/1988 | Dieppedalle | |
| 5,170,310 A | 12/1992 | Studtmann | |
| 5,216,352 A | 6/1993 | Studtmann | |
| 5,532,635 A | 7/1996 | Watrous | |
| 5,536,976 A | 7/1996 | Churchill | |
| 5,615,075 A | 3/1997 | Kim | |

(Continued)

FOREIGN PATENT DOCUMENTS

WO    WO2018166005    9/2018

OTHER PUBLICATIONS

A. Mokhberdoran, D. Van Hertem, N. Silva, H. Leite and A. Carvalho, "Multiport Hybrid HVDC Circuit Breaker," in IEEE Transactions on Industrial Electronics, Jan. 2018, pp. 309-320, vol. 65, No. 1.

(Continued)

*Primary Examiner* — Stephen W Jackson
(74) *Attorney, Agent, or Firm* — Greenberg Traurig, LLP

(57) ABSTRACT

A multi-port solid-state circuit breaker system includes a first electrical power bus, a second electrical power bus, and a plurality of breaker legs conductively coupled with the first electrical power bus and the second electrical power bus in parallel with one another. Each of the plurality of breaker legs includes a first power semiconductor device coupled in series with a second power semiconductor device and an input/output port intermediate the first power semiconductor device and the second power semiconductor device. At least one of the first semiconductor device and the second semiconductor device includes an actively controlled switching device. A surge suppressor is conductively coupled in parallel with the plurality of breaker legs.

21 Claims, 16 Drawing Sheets

(56) References Cited

U.S. PATENT DOCUMENTS

| | | | |
|---|---|---|---|
| 5,812,353 | A | 9/1998 | Albert |
| 7,554,796 | B2 | 6/2009 | Coffey |
| 7,701,087 | B2 | 4/2010 | Eckroad |
| 8,018,095 | B2 | 9/2011 | Arimilli |
| 8,416,550 | B1 | 4/2013 | Sioma |
| 8,503,138 | B2 | 8/2013 | Demetriades |
| 8,717,716 | B2 | 5/2014 | Hafner |
| 8,797,128 | B2 | 8/2014 | Liljestrand |
| 8,947,843 | B2 | 2/2015 | Juhlin |
| 9,035,212 | B2 | 5/2015 | Liljestrand |
| 9,148,011 | B2 | 9/2015 | Magnusson |
| 9,270,119 | B2 | 2/2016 | Broussard |
| 9,455,111 | B2 | 9/2016 | Webb |
| 9,698,589 | B1 | 7/2017 | Leyh |
| 9,929,567 | B2 | 3/2018 | Wang |
| 10,131,441 | B2 | 11/2018 | Edwards |
| 10,193,322 | B2 | 1/2019 | Waldron |
| 10,389,104 | B1 | 8/2019 | Corzine |
| 10,418,803 | B2 | 9/2019 | Cao |
| 10,425,015 | B2 | 9/2019 | Armschat |
| 10,541,530 | B2 | 1/2020 | Kennedy |
| 10,693,289 | B2 | 6/2020 | Davidson |
| 10,707,674 | B2 | 7/2020 | Tang |
| 2009/0262471 | A1 | 10/2009 | Nicolay |
| 2011/0095810 | A1 | 4/2011 | Weng |
| 2015/0002977 | A1* | 1/2015 | Dupraz ............... H01H 9/548 361/115 |
| 2015/0372473 | A1* | 12/2015 | Wang ............... H01H 9/548 361/57 |
| 2017/0178832 | A1* | 6/2017 | Berard ............... H03K 17/567 |
| 2019/0267810 | A1 | 8/2019 | Johns |
| 2020/0153238 | A1 | 5/2020 | Loder |
| 2020/0212792 | A1* | 7/2020 | Westerweller ........... H02H 9/06 |
| 2020/0266624 | A1 | 8/2020 | Zhou |

OTHER PUBLICATIONS

E. Kontos, T. Schultz, L. Mackay, L. M. Ramirez-Elizondo, C. M. Franck and P. Bauer, "Multiline Breaker for HVdc Applications," in IEEE Transactions on Power Delivery, Jun. 2018, pp. 1469-1478, vol. 33, No. 3.

W. Liu, F. Liu, X. Zha, C. Chen and T. Yu, "A topology of the multi-port DC circuit breaker for multi-terminal DC system fault protection," 2017 IEEE Energy Conversion Congress and Exposition (ECCE), Cincinnati, OH, 2017, pp. 3760-3763.

M. Corti, E. Tironi and G. Ubezio, "Multi-port converters in smart grids: Protection selectivity," 2016 International Symposium on Power Electronics, Electrical Drives, Automation and Motion (SPEEDAM), Anacapri, 2016, pp. 143-149.

C. Gu et al., "Multi-Port Power Conversion Systems for the More Electric Aircraft," IECON 2018 - 44th Annual Conference of the IEEE Industrial Electronics Society, Washington, DC, 2018, pp. 5553-5558.

* cited by examiner

MULTI-PORT SOLID-STATE CIRCUIT BREAKER APPARATUSES, SYSTEMS, AND METHODS

TECHNICAL FIELD

The present disclosure relates to multi-port solid-state circuit breaker ("SSCB") apparatuses, systems, and methods which may be utilized in a number of applications including, for example, electric vehicle ("EV") charging stations, data centers, microgrids, and other applications in which a multiple power input/output ports are operatively coupled with an AC or DC electrical power bus and are operatively coupled with respective ones of a plurality of power loads or power sources.

BACKGROUND

With reference to FIG. 1, there is illustrated an exemplary prior art system 100 including a conventional multi-port SSCB system 110 comprising a plurality of conventional SSCB 104 (SSCB 104a-104f) and a plurality of sources or loads 130 (sources or loads SSCB 130a-130f) operatively coupled with a plurality of ports 102. In the illustrated example, prior art system 100 is provided as an EV charging station and the plurality of sources or loads 130 include a solar generation source 130a operatively coupled with a port 102a, a power grid source 130b operatively coupled with a port 102b, a battery 130c operatively coupled with a port 102c which is an example of a bidirectional source/load, and a plurality of EV chargers 130d, 130e, 130f operatively coupled with respective port 102d, 102e, 102f.

The SSCB 104a-104f are electrically coupled with a DC bus 106 and thereby electrically coupled with one another. The SSCB 104a-104f are also each electrically coupled with a respective one of six illustrated ports SSCB 104a-104f of the multi-port SSCB system 110. Each of the plurality of conventional SSCB 104 comprises circuitry 40 including two power semiconductor switching devices 41, 43 which are connected to one another in an anti-series relationship and are respectively connected in parallel with reverse blocking diodes 42, 44 to provide bidirectional voltage blocking and current conduction. The power semiconductor switching devices 41, 43 are together connected in parallel relationship with a metal oxide varistor ("MOV") 45 or another voltage clamping component to absorb remnant energy arising due to parasitic inductances. The SSCB 104a-104f can be opened or closed to interrupt or establish an electrical connection with a respective one of the plurality of ports 102 and a corresponding respective one of the plurality of sources or loads 130 connected thereto.

With reference to FIG. 2, there is illustrated a portion of the conventional multi-port SSCB system 110 in an example operational state in which the SSCB 104b, 104d are closed to provide an electrical connection between the power grid source 130b, the DC bus 106, and the EV charger 130d. The other SSCB 104a, 104c, 104d, 104f (only two of which are depicted in FIG. 2, but all of which are present as indicated by ellipsis 110n) are opened to disconnect their respective input/output nodes and corresponding respective sources or loads from the DC bus 106. The input/output node 102b receives input power (Pin) from power grid source 130b and the input/output node 102d provides output power (Pout) to EV charger 130d. Current flow from the input/output node 102b to the input/output node 102d along current flow path ha which passes through the power semiconductor switching devices 41b, 43b of the SSCB 104b and the power semiconductor switching devices 41d, 43d of the SSCB 104d resulting in attendant power losses due to the on resistances of the aforementioned four power semiconductor devices.

Conventional multi-port SSCB apparatuses, systems, and methods, such as those of the prior art system 100 as well as other known SSCB apparatuses, systems, and methods, suffer from a number of disadvantages and shortcomings, including those respecting controllability, complexity, component numerosity, cost, efficiency, fault clearing capability, operational flexibility, and power losses, among others. There remains a longstanding substantial need for the unique apparatuses, methods, and systems disclosed herein.

DISCLOSURE OF EXAMPLE EMBODIMENTS

For the purposes of clearly, concisely, and exactly describing example embodiments of the present disclosure, the manner, and process of making and using the same, and to enable the practice, making and use of the same, reference will now be made to certain example embodiments, including those illustrated in the figures, and specific language will be used to describe the same. It shall nevertheless be understood that no limitation of the scope of the invention is thereby created, and that the invention includes and protects such alterations, modifications, and further applications of the example embodiments as would occur to one skilled in the art.

BRIEF SUMMARY OF THE DISCLOSURE

Example embodiments comprise unique multi-port solid-state circuit breaker apparatuses, methods, systems, and techniques. Some forms of the aforementioned example embodiments comprise a plurality of breaker legs conductively coupled in parallel with one another, each of the plurality of breaker legs comprising a first power semiconductor device coupled in series with a second power semiconductor device and a port intermediate the first power semiconductor device and the second power semiconductor device, at least one of the first semiconductor device and the second semiconductor device comprising an actively controlled switching device, and a surge suppressor conductively coupled in parallel with the plurality of breaker legs. Further embodiments, forms, objects, features, advantages, aspects, and benefits shall become apparent from the following description and drawings.

DETAILED DESCRIPTION OF EXAMPLE EMBODIMENTS

Figure 1:
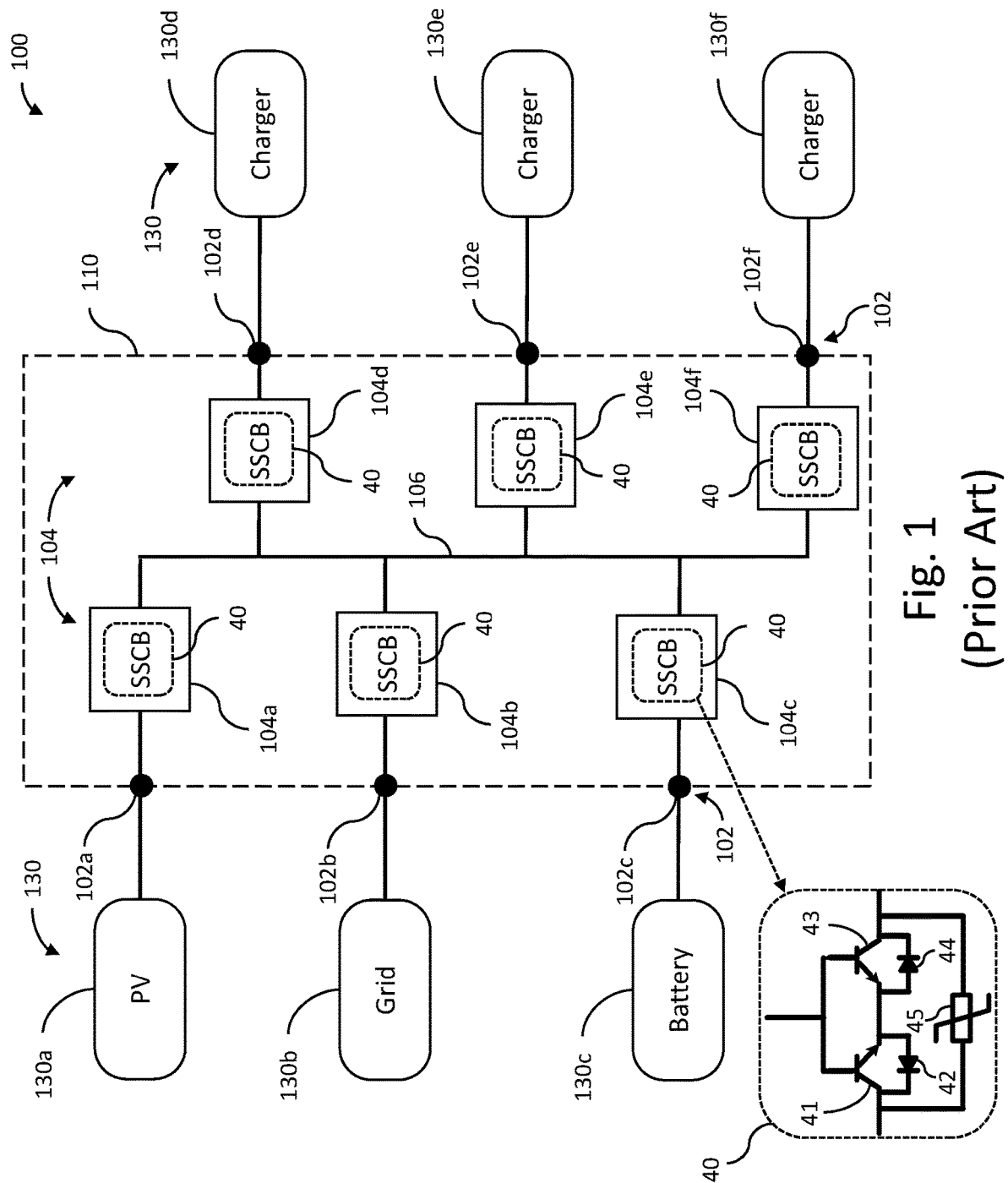
FIGS. 1 and 2 are schematic diagrams illustrating an exemplary prior art system.
Figure 2:
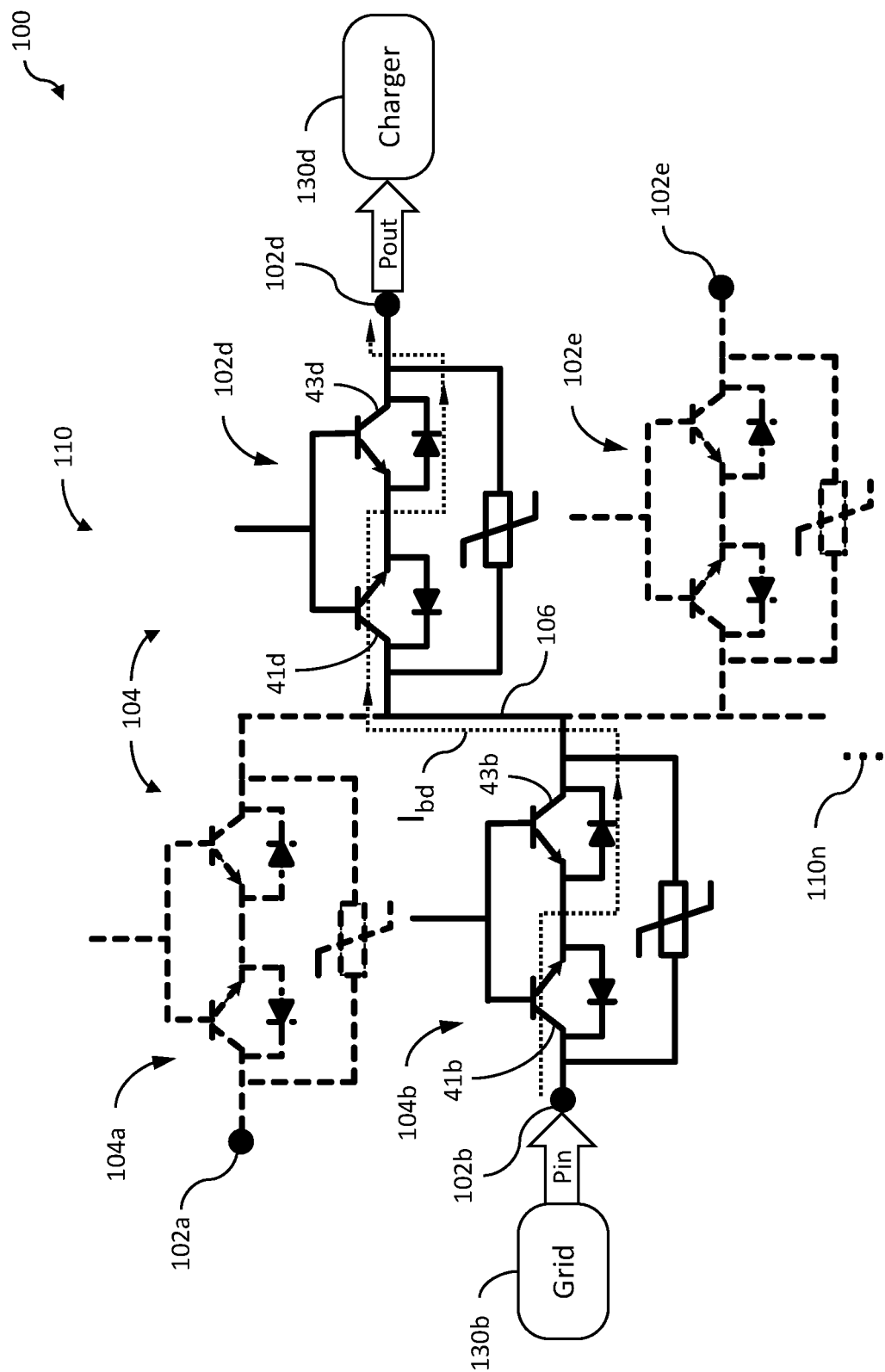
Figure 3:
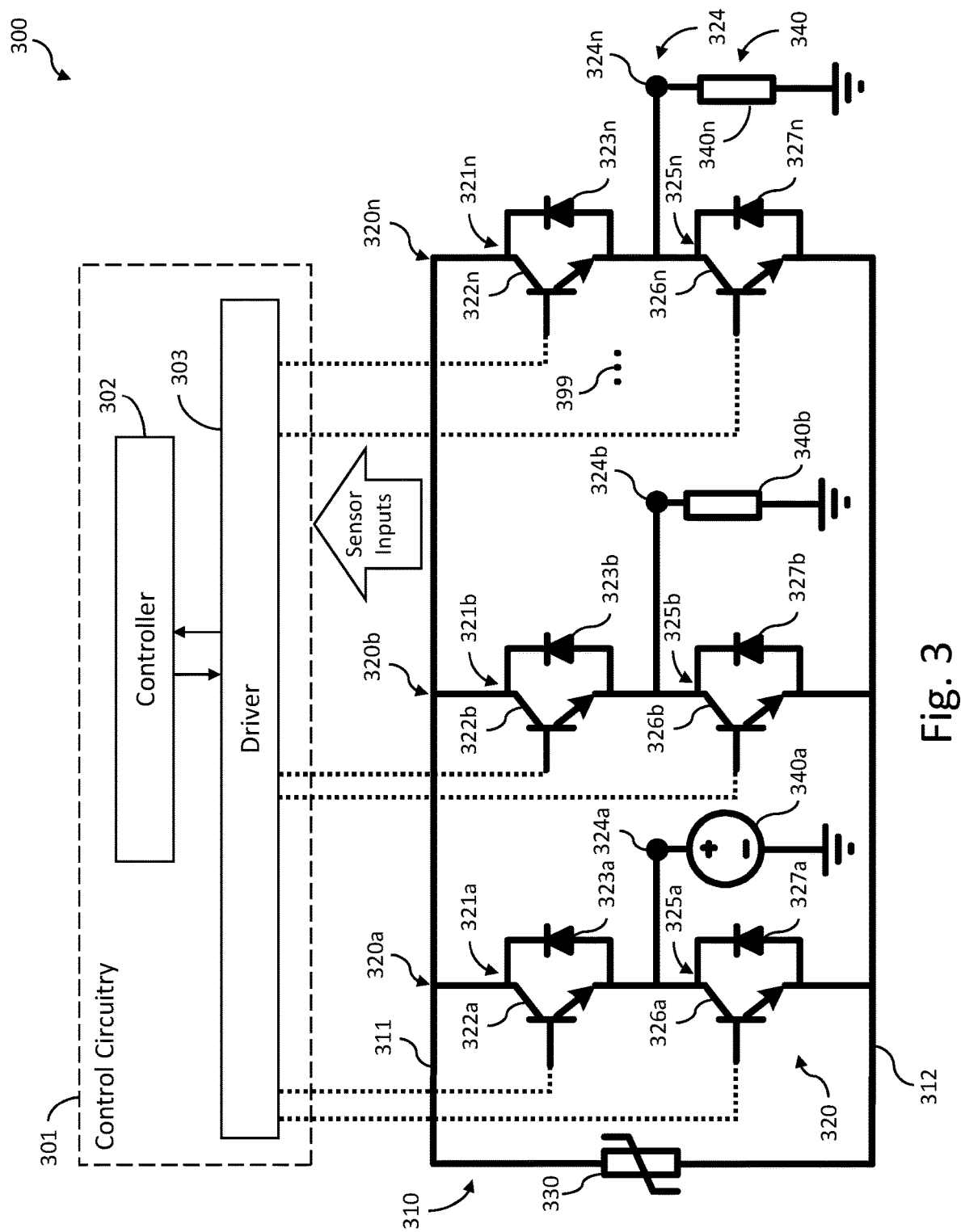
FIG. 3 is a schematic diagram illustrating an example multi-port SSCB system.

With reference to FIG. 3, there is illustrated an example system 300 including an example multi-port SSCB system 310 including a plurality of input/output ports 324 (also referred to herein as ports 324) operatively coupled with a plurality of sources or loads 340. In the system 300, the plurality of ports 324 and the plurality of sources or loads 340 comprise at least three input/output ports 324a, 324b, 324n (also referred to herein as ports 324a, 324b, 324n) operatively coupled with respective ones of at least three sources or loads 340a, 340b, 340n. In other embodiments, the plurality of ports 324 and the plurality of sources or loads 340 may comprise a different number of two or more ports operatively coupled with a corresponding number of two or more sources or loads.

The multi-port SSCB system 310 and other SSCB apparatuses, devices, methods, and systems according to the present disclosure may be configured to selectably establish and interrupt a current path to or from the plurality of ports 324 or other ports using only solid-state semiconductor devices. Thus, while mechanical or hybrid solid-state/mechanical switching devices and arrangements may be included in certain embodiments, they are not necessary or required and a current path to or from the plurality of ports 324 or other ports may be established or interrupted using only solid-state semiconductor devices In the illustrated embodiment, the system 300 is depicted in a general form that may be further adapted, configured, and implemented in connection with a number of particular applications. For example, in some example forms, the system 300 may be implemented in connection with an electric vehicle ("EV") charging station. In such forms, the multi-port SSCB system 310 may be arranged and configured to protect one or more chargers and one or more power sources thereof as well as other types of sources and loads associated with an EV charging station.

In additional example forms, the system 300 may be implemented in connection with a data center which can be an AC data center, a DC data center, or a hybrid AC-DC data center. In such forms, the multi-port SSCB system 310 may be configured and provided to protect multiple individual server loads and one or more power sources, for example, as a branch breaker system, a rack breaker system, or other types of sources and loads associated with a data center.

In further example forms, the system 300 may be implemented in connection with a motor control center or system. In such forms, the multi-port SSCB system 310 may be configured and provided in connection with a cabinet, enclosure, or other structural components which are supplied by one or more sources and which supplies one or more motors or other loads associated with a motor control center or system.

In additional example forms, the system 300 may be implemented in connection with a smart building system or other applications including a hybrid AC-DC microgrid. In such forms, the multi-port SSCB system 310 may be configured to provide protection for one or more sources and one or more loads coupled with an AC bus and for one or more sources and one or more loads coupled with a DC bus.

In further example forms, the system 300 may be implemented in connection with an electrical panel or panel board such as lighting panels and load centers. In such forms, the multi-port SSCB system 310 may be configured to provide protection for one or more sources and one or more loads coupled with the electrical panel or panel board.

In other example forms, the system 300 may be implemented in connection with other systems in which multiple power ports are operatively coupled with an AC or DC electrical power bus and are operatively coupled with respective ones of a plurality of power loads or power sources and the multi-port SSCB system 310 may be configured and provided to protect a number of types of sources or loads associated therewith.

The multi-port SSCB system 310 may also be configured and provided in a number of form factors. In some example forms, the multi-port SSCB system may be configured an provided in a unitary or self-contained circuit breaker device form factor such as a miniature circuit breaker or a molded case circuit breaker. In some example forms, the multi-port SSCB system may be configured an provided in a modular circuit breaker device form factor comprising a reconfigurable combination of two or more unitary devices, or a distributed circuit breaker device comprising a distributed combination of two or more unitary devices.

The multi-port SSCB system 310 comprises a first electrical power bus 311 and a second electrical power bus 312 which may also be referred to herein respectively as bus 311 and bus 312 or collectively as busses 311, 312. In the multi-port SSCB system 310, the busses 311, 312 are adapted and configured to distribute DC electrical power. In other embodiments the busses 311, 312 may be adapted and configured to distribute AC electrical power. In other embodiments the busses 311, 312 may be adapted and configured to selectably distribute AC electrical power or DC electrical power. The busses 311, 312 may be configured and provided in a number of forms suitable for the distribution of electrical power, for example, one or more busbars, cabling, wires, other electrically conductive structures, or combinations thereof.

The multi-port SSCB system 310 comprises a plurality of breaker legs 320. In the multi-port SSCB system 310, the plurality of breaker legs 320 are depicted as comprising at least three breaker legs 320a, 320b, 320n. In other embodiments, the plurality of breaker legs may comprise a different number of breaker legs comprising two or more breaker legs. The plurality of breaker legs 320 are conductively coupled with the first bus 311 and the second bus 312 in a parallel relationship with one another. Each of the plurality of breaker legs 320 comprises a first power semiconductor device coupled in series with a second power semiconductor device, at least one of which comprises an actively controlled switching device. Each of the plurality of breaker legs 320 further comprises a port intermediate the first power semiconductor device and the second power semiconductor device. A surge suppressor 330 is conductively coupled with the first bus 311 and the second bus 312 in parallel with the plurality of breaker legs. In the multi-port SSCB system 310, the surge suppressor 330 is provided in the form of metal oxide varistor (MOV), it being appreciated that other embodiments and forms may additionally or alternatively comprise other types of surge suppressors.

In the multi-port SSCB system 310, each of the breaker legs 320a, 320b, 320n comprises a respective first power semiconductor device 321a, 321b, 321n coupled in series with a respective second power semiconductor device 325a, 325b, 325n, and a respective port 324a, 324b, 324n, intermediate the respective first power semiconductor device 321a, 321b, 321n and the respective second power semiconductor device 325a, 325b, 325n. The first power semiconductor devices 321a, 321b, 321n respectively comprise actively-controlled, solid-state switching devices 322a, 322b, 322n which are respectively coupled in anti-parallel with reverse blocking diodes 323a, 323b, 323n. The second power semiconductor device 325a, 325b, 325n comprise actively-controlled, solid-state switching devices 326a, 326b, 326n which are respectively coupled in anti-parallel with reverse blocking diodes 327a, 327, 327n.

In the multi-port SSCB system 310, the actively-controlled, solid-state switching devices 322a, 322b, 322n, 326a, 326b, 326n comprise insulated gate bipolar transistors (IGBTs). Other embodiments and forms may additionally or alternatively comprise a number of other types of actively-controlled, solid-state switching devices including, for example, metal oxide semiconductor field effect transistors (MOSFETs), silicon carbide metal oxide semiconductor field effect transistors (SiC MOSFETs), junction gate field-effect transistor (JFET) devices such as SiC junction gate field-effect transistor (SiC JFETs), gallium nitride high-electron-mobility transistors (GaN HEMTs), gallium nitride metal oxide semiconductor field effect transistors (GaN MOSFETs), thyristor devices such as integrated gate-commutated thyristor (IGCT), gate turn-off thyristor (GTO), and emitter turn-off (ETO) thyristors, other types of semiconductor devices which may be Si-based, SiC-based, GaN-based, or combinations thereof.

In the multi-port SSCB system 310, both the first power semiconductor devices 321a, 321b, 321n, and the second power semiconductor devices 325a, 325b, 325n comprise actively-controlled, solid-state switching devices providing one example of a multi-port SSCB system controllable to accommodate and provide bidirectional power flow. Other embodiments and forms comprise one or more breaker legs comprising a first power semiconductor device coupled in series with a second power semiconductor device only one of which comprises an actively-controlled, solid-state switching device.

The system 300 further includes control circuitry 301 which is configured to control and monitor a number of aspects of the operation of the multi-port SSCB system 310. The control circuitry 301 includes a controller 302 and a driver 303. The controller 302 comprises one or more microprocessors, microcontrollers, or other integrated circuit-based logic or control components (e.g., ASICs, FPGAs, or other IC-based processing or computing devices) and one or more non-transitory machine-readable memory devices storing executable instructions configured to process sensor information received by the control circuitry 301 from the multi-port SSCB system 310 and to determine and output control commands to the driver 303.

The driver 303 is operatively coupled with and configured to provide control signals to turn on and off the first power semiconductor devices 321a, 321b, 321n, and the second power semiconductor devices 325a, 325b, 325n in response to the control commands received from the controller 302. The driver 303 is configured to output control signals at an operating voltage selected to control the on/off state of the power semiconductor devices with which it is coupled. In some forms, this voltage may be of a magnitude posing a risk of damage to the controller 301 or other lower voltage circuitry of the control circuitry 301. Accordingly, the driver 303 may be isolated from the controller 301 and other lower voltage circuitry of the control circuitry 301.

It shall be appreciated that the control circuitry 301 is depicted in a simplified form in the embodiments illustrated in FIGS. 4, 5A-5D, 7, 8A-8D, 9, and 10, but nevertheless includes the same components, elements, and features illustrated and described in connection with FIG. 3. It shall also be appreciated that the control circuitry 301 may be provided in a number of different forms and may include a number of additional components, elements, and features.

Figure 4:
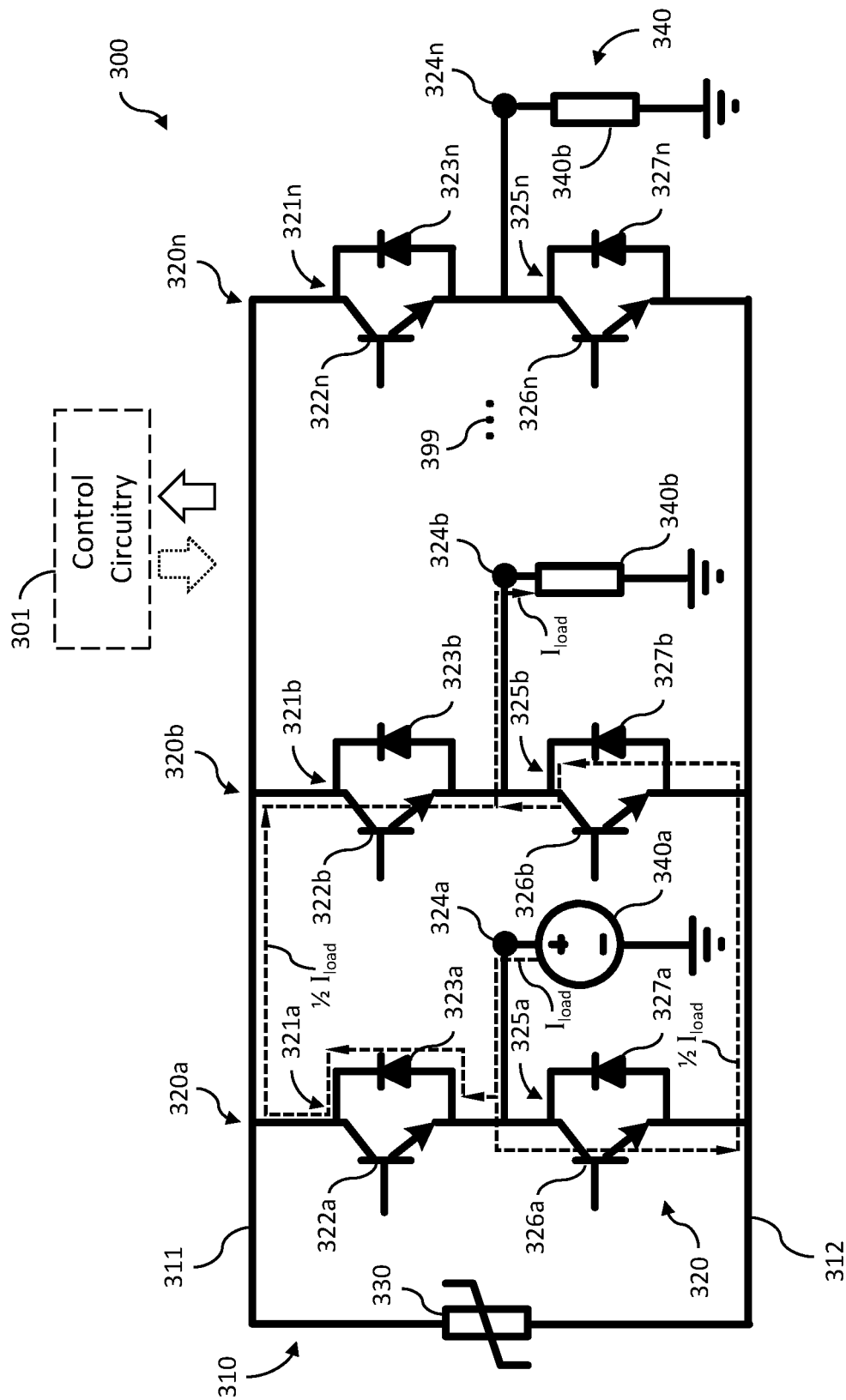
FIG. 4 is a schematic diagram illustrating the multi-port SSCB system of FIG. 3 in an example operating mode.

With reference to FIG. 4, there is illustrated an example operating state of the system 300 and the multi-port SSCB system 310. In the illustrated operating state, source 340a operates as a power source providing power to port 324a, load 340b operates as a load receiving power from port 324a, and load 340n is decoupled from the multi-port SSCB system 310 (e.g., by actively-controlled, solid-state switching devices 322n, 326n of power semiconductor devices 321n, 325n being controlled to an off or open state) and does not provide power to or receive power from port 324n.

In the illustrated operating state, the load current ($I_{load}$) flowing from the source 340a to the load 340b flows from the port 324a to the port 324b along a first current flow path and a second current flow path, i.e., the load current ($I_{load}$) is shared between the first current flow path and the second current flow path. The first current flow path includes reverse blocking diode 323a, a portion of power distribution bus 311, and actively-controlled, solid-state switching device 322b and caries a portion of the load current (Load), for example, one-half of the load current ($\frac{1}{2} I_{load}$) in the case where the two current paths are equally balanced. The second current flow path includes actively-controlled, solid-state switching device 326a, a portion of power distribution bus 312, and reverse blocking diode 327b and caries a portion of the load current ($I_{load}$), for example, one-half of the load current ($\frac{1}{2} I_{load}$) in the case where the two current paths are equally balanced.

It shall be appreciated that the combined effect of providing two current paths, each with a reduced number of semiconductor devices, provides a substantial reduction of power loss. For example, where the same devices are used for all breaker legs, the losses may be ¼ the losses as compared to conventional topologies (e.g., system 100 and multi-port SSCB system 110) in which a single current flow path including four power semiconductor devices carries the entire load current. The reduction of the total number of solid-state switching devices in the load current flow path from four devices to two devices provides a 50% reduction in conductive losses. The provision of two current paths provides an additional 50% reduction in conductive losses due to each current flow path carrying only one-half of the load current ($\frac{1}{2} I_{load}$). For example, assuming that each power semiconductor device has an on-state resistance is $R_{on}$, then the total conduction losses of such conventional topologies is $4 \times R_{on} \times I_{load}^2$, whereas the total conduction losses of system 300 and multi-port SSCB system 310 is $2 \times 2 \times R_{on} \times (\frac{1}{2} I_{load})^2$ which simplifies to $R_{on} \times I_{load}^2$ thus illustrating that the total conduction losses of the multi-port SSCB system 310 are 25% of the conduction losses of conventional topologies. It shall be understood that these calculations apply to a particular, simplified case where the load current ($I_{load}$) is balanced between the first current flow path and the second current flow path, and the semiconductor devices all have the same on-state resistance ($R_{on}$). In other cases, the semiconductor devices may have different on-state resistance ($R_{on}$) or may include devices which do not have an on-state resistance and the current may not be perfectly balanced between the first current flow path and the second current flow path. Nevertheless, a substantial reduction in power loss is also realized in these cases.

Figure 5A:
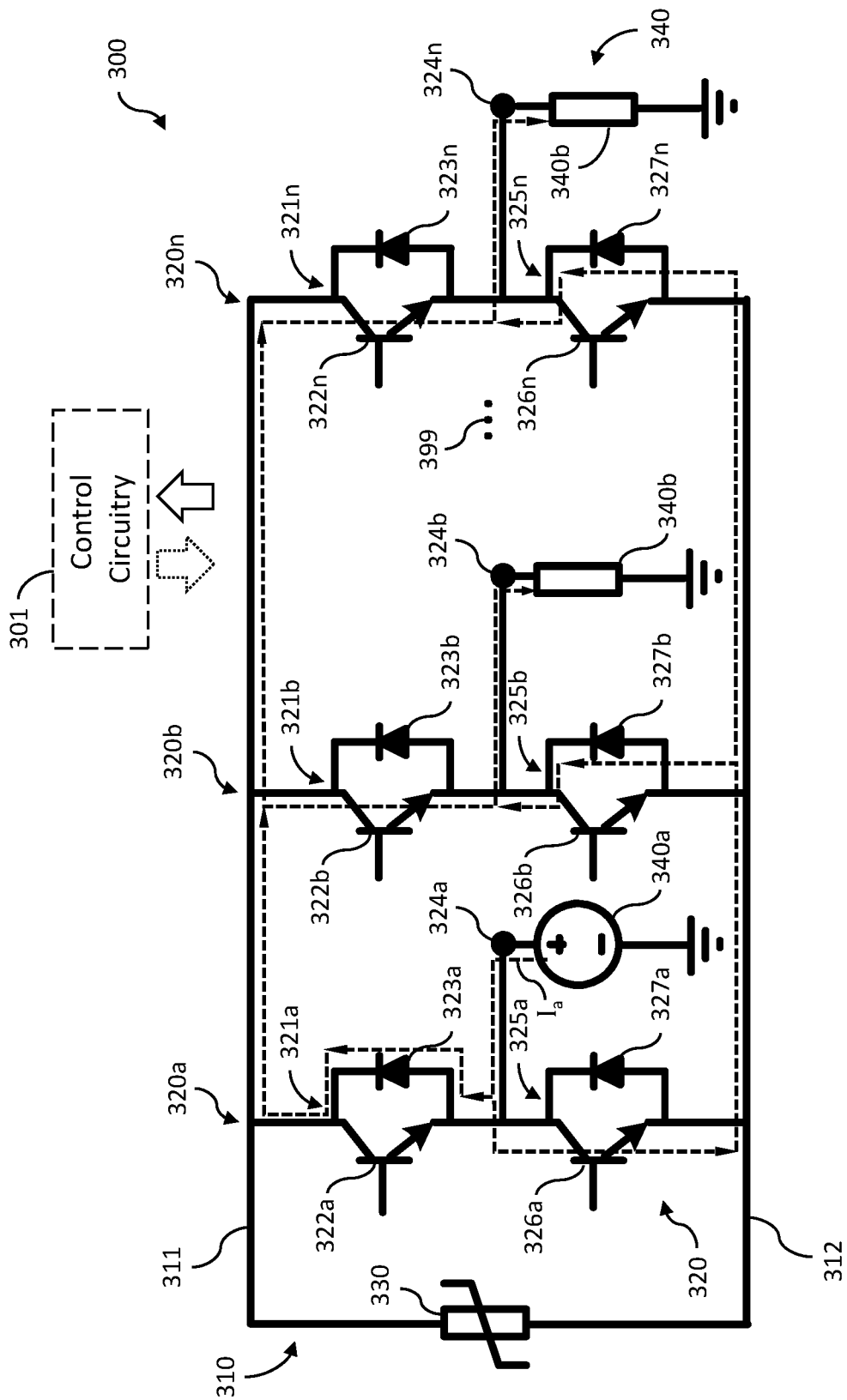
FIGS. 5A-5D are schematic diagram illustrating an example fault clearing operation of the multi-port SSCB system of FIG. 3

With reference to FIGS. 5A-5D, there is illustrated an example fault clearing operation which may be performed in connection with the system 300 and the multi-port SSCB system 310. FIG. 5A illustrates the system 300 and the multi-port SSCB system 310 in an example non-fault conduction mode comprising four current flow paths from port 324a to ports 324b, 324n. A first current flow path between the port 324a and the port 324b includes the reverse blocking diode 323a, a portion of the power distribution bus 311, and the actively-controlled, solid-state switching device 322b. A second current flow path between the port 324a and the port 324b includes the actively-controlled, solid-state switching device 326a, a portion of the power distribution bus 312, and the reverse blocking diode 327b. A third current flow path between the port 324a and the port 324n includes the reverse blocking diode 323a, a portion of the power distribution bus 311, and the actively-controlled, solid-state switching device 322n. A fourth current flow path between the port 324a and the port 324n includes the actively-controlled, solid-state switching device 326a, a portion of the power distribution bus 312, and the reverse blocking diode 327n.

Figure 5B:
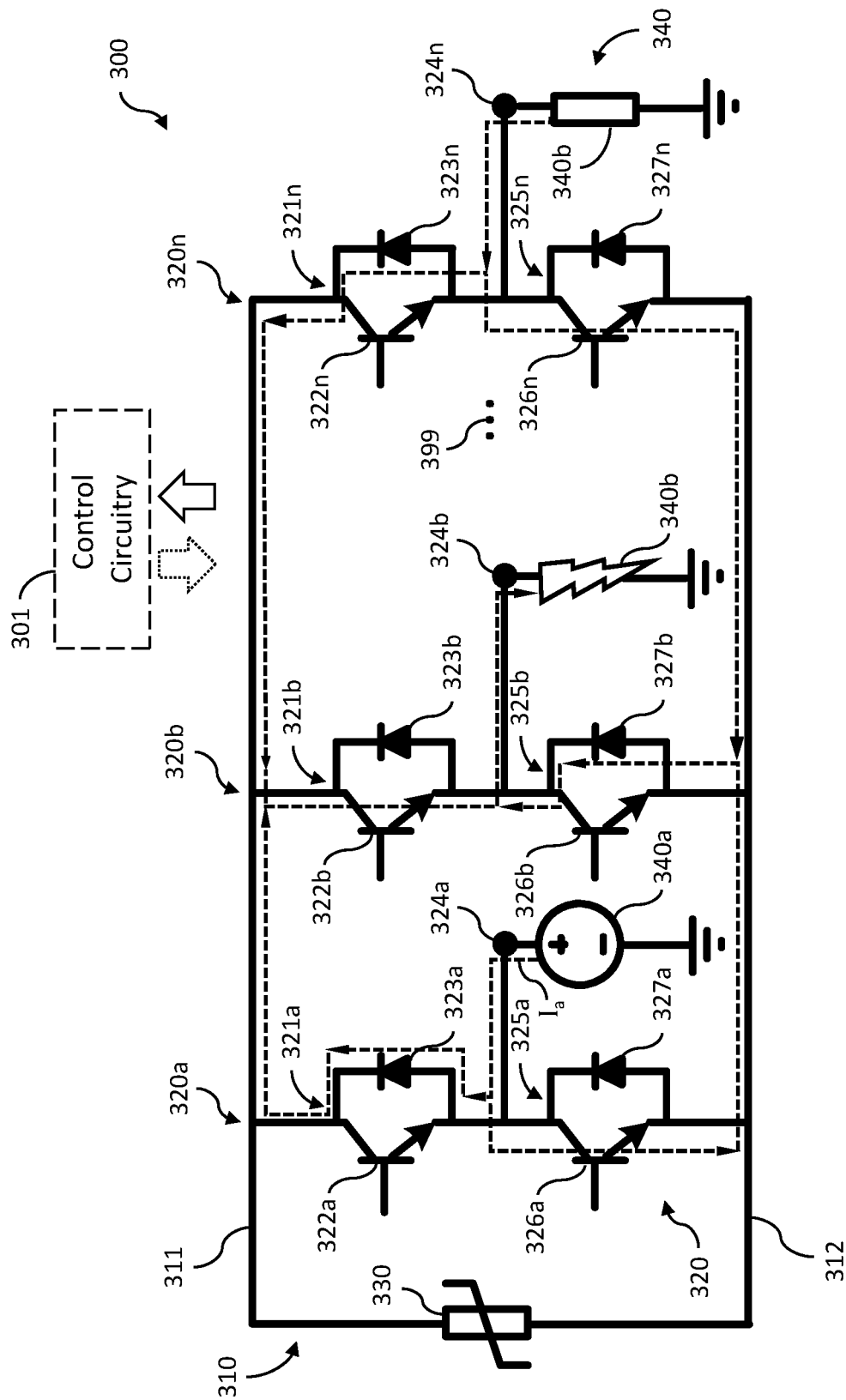

The multi-port SSCB system 310 transitions from the mode of FIG. 5A to the mode of FIG. 5B upon the occurrence of a fault condition, such as a load short circuit. FIG. 5B illustrates the system 300 and the multi-port SSCB system 310 in an example short circuit fault mode in which a short circuit fault condition is present in the load 340b. In this mode, the current paths from the power source 340a to the faulted load 340b remains substantially the same as the mode illustrated in FIG. 5A, with the only change being that the fault current rises quickly. In the illustrated example, the load 340n is a capacitive load. Accordingly, current also flows from the load 340n to the faulted load 340b. In other examples, the load 340n may be a resistive load or an inductive load in which case no current will flow from the load 340n to the faulted load 340b.

Figure 5C:
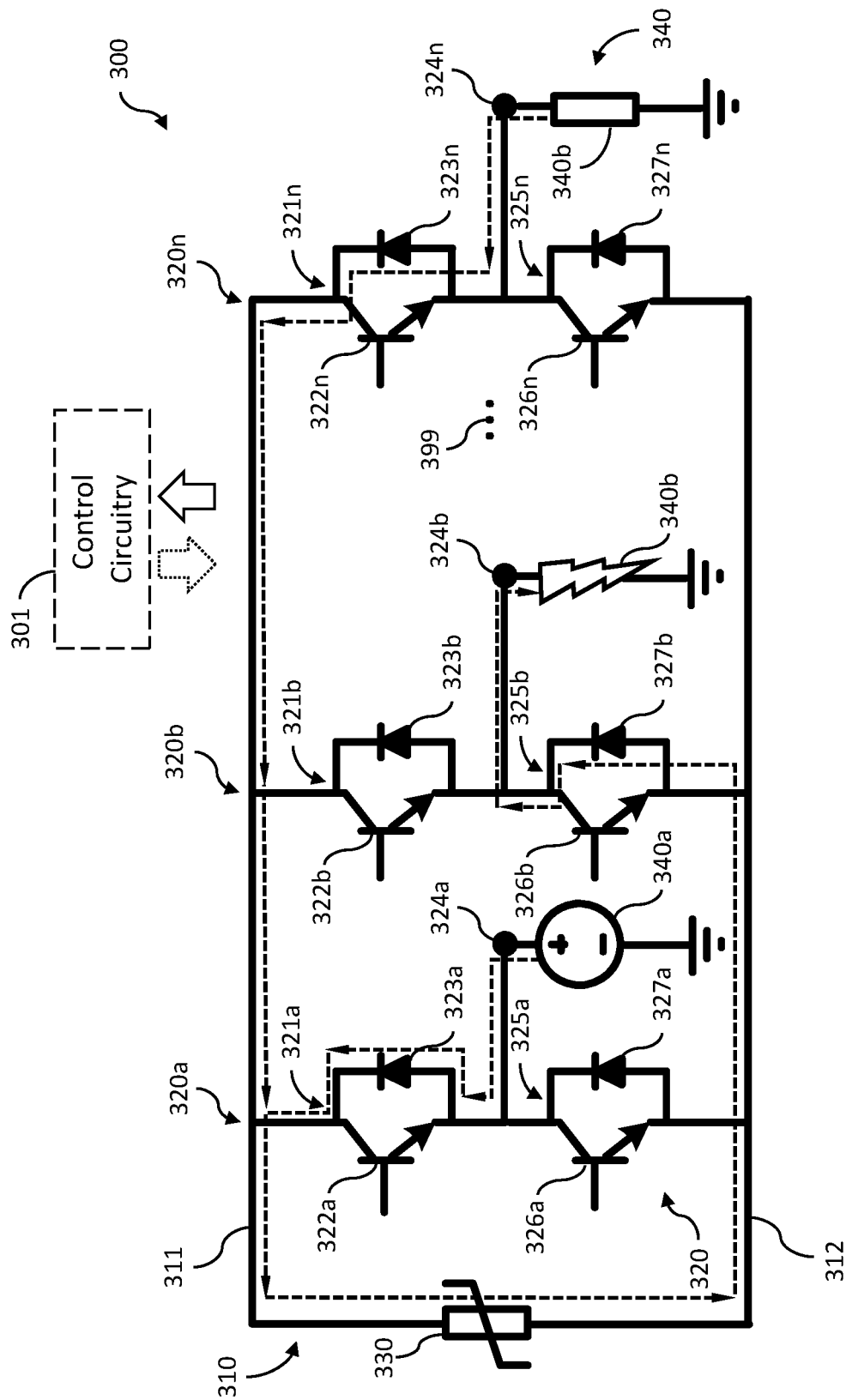

The multi-port SSCB system 310 transitions from the mode of FIG. 5B to the mode of FIG. 5C in response to detection of a fault current. FIG. 5C illustrates the system 300 and the multi-port SSCB system 310 in an example fault current commutation mode. In this mode, the actively-controlled, solid-state switching devices 326a, 322b, 326n of the power semiconductor devices 325a, 321b, 325n respectively, are turned off to interrupt fault current flowing through the power semiconductor devices 325a, 321b, 325n to the faulted load 340b. The fault current is commutated to flow from the source 340a and the load 340n through surge suppressor 330 and then through power semiconductor device 325b to the faulted load 340b. In response, the voltage of the surge suppressor 330 quickly rises to its clamping voltage, and the surge suppressor 330 absorbs the remnant energy in the system and assists in interrupting and arresting the fault current.

Figure 5D:
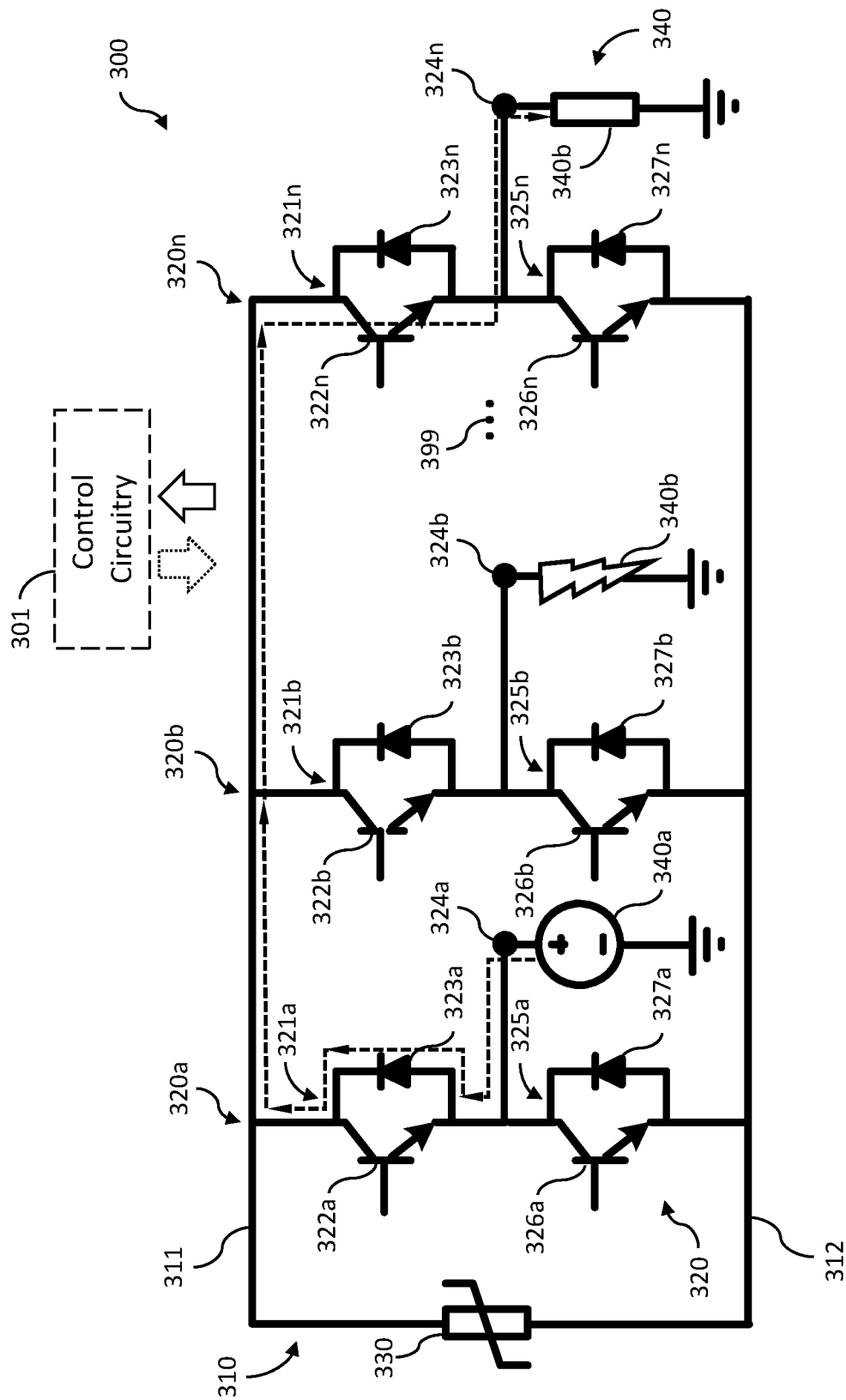

The multi-port SSCB system 310 transitions from the mode of FIG. 5C to the mode of FIG. 5D in response to the interruption and arresting of the fault current. FIG. 5D illustrates the system 300 and the multi-port SSCB system 310 in a post-fault mode in which the fault current has been interrupted and arrested. In this mode, a load current only flows along the aforementioned third current flow path between the port 324a and the port 324n which includes the reverse blocking diode 323a, a portion of the power distribution bus 311, and the actively-controlled, solid-state switching device 322n. In the illustrated post-fault mode, the conduction losses increase relative to non-fault conduction mode due to the loss of a second current path but remain 50% lower than the losses of conventional topologies.

Figure 6:
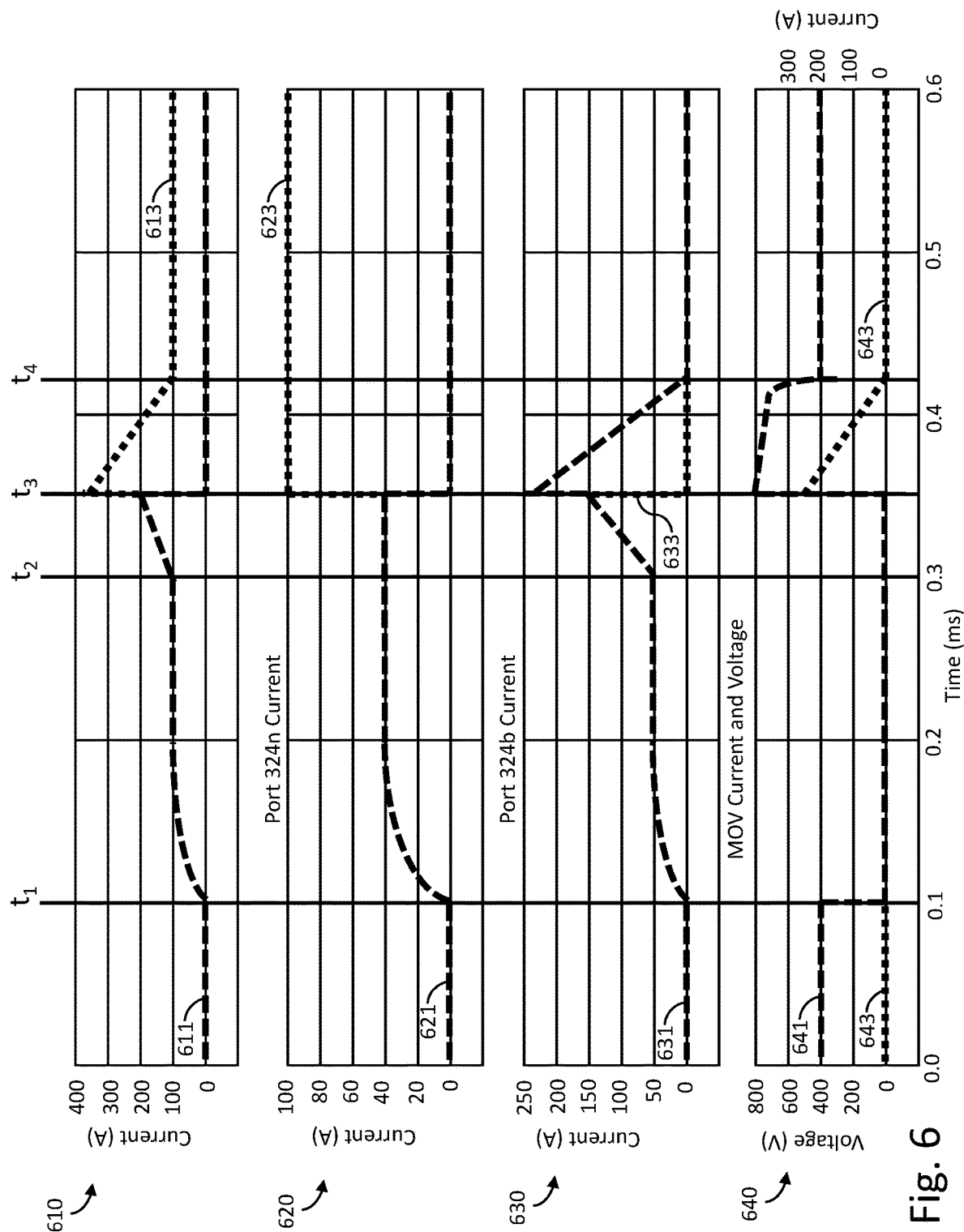
FIG. 6 is a set of graphs illustrating voltage and current values associated with the fault clearing operation of FIGS. 5A-5D.

With reference to FIG. 6, there are illustrated graphs 610, 620, 630, 640 illustrating a number of current and voltage waveforms during an example fault clearing operation of the type illustrated and described in connection with FIGS. 5A-5D performed in connection with systems such as the system 300 and the multi-port SSCB system 310. In the illustrated example, the source 340a is a 400V DC power source, the load 340b is an inductive load with 100 μH inductance, and the load 340n is a resistive load with a 4Ω resistance.

Graph 610 illustrates the current flow through port 324a including the current through the power semiconductor device 321a which is indicated by curve 613 and the current through the power semiconductor device 325a which is indicated by curve 611. Graph 620 illustrates the current flow through port 324n including the current through the power semiconductor device 321n which is indicated by curve 623 and the current through the power semiconductor device 325n which is indicated by curve 621. Graph 630 illustrates the current flow through port 324b including the current through the power semiconductor device 321b which is indicated by curve 633 and the current through the power semiconductor device 325b which is indicated by curve 631. Graph 640 illustrates the current flow through surge suppressor 330 which is indicated by curve 643 and the voltage across the surge suppressor 330 which is indicated by curve 641.

In FIG. 6, the time period from t1 to t2 is the non-fault conduction mode of FIG. 5A wherein the load current flows from the port 324a to the ports 324b, 324n equally through the two current paths described above. The time period from t2 to t3 indicates the short circuit fault mode of FIG. 5B wherein the load 340b experiences a short circuit fault. The current through the port 324a and the port 324b start to increase. The port 324n is coupled with a resistive load and remains the same current level.

The time period from t2 to t3 is the fault current commutation mode of FIG. 5C, where the actively-controlled, solid-sate switching devices 326a, 322b, 326n of the power semiconductor devices 325a, 321b, 325n respectively, are turned off. It can be seen from graphs 610 and 630 that the current in the actively-controlled, solid-sate switching devices 326a, 322b, 326n goes to zero and commutate to their corresponding diode paths quickly. In graph 640, the fault current starts to flow through the surge suppressor 330 and the surge suppressor voltage rises to the clamping voltage. Gradually, the fault current is interrupted to zero at time t4. The period of time after time t4 is the post-fault conduction mode of FIG. 5D, where the short circuit fault in the port 324b is isolated and the port 324n conducts the nominal 100A load current. As noted above, in this mode, there is only one current path left from the port 324a to the port 324n.

Figure 7:
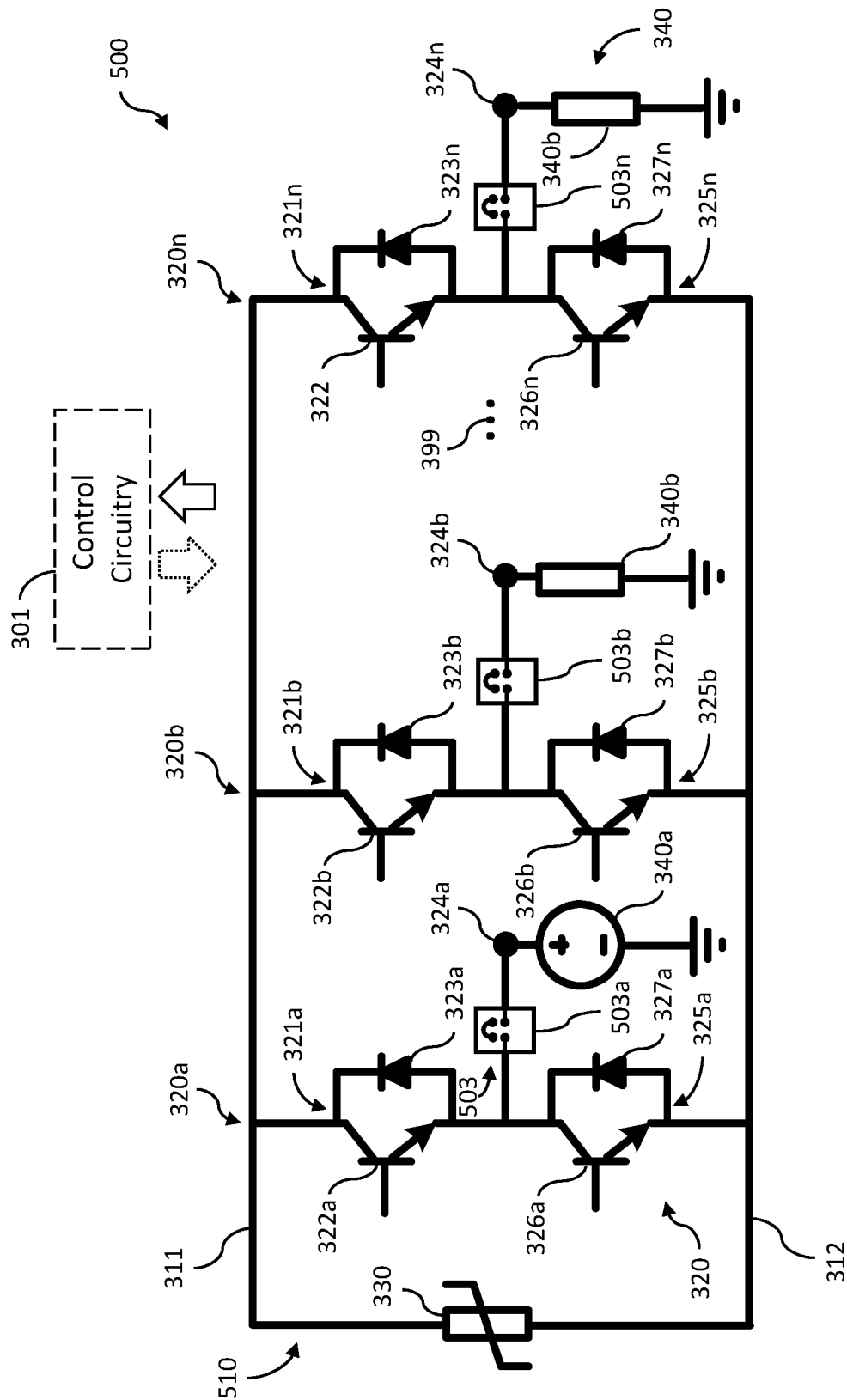
FIG. 7 is a schematic diagram illustrating an example multi-port SSCB system.
Figure 8A:
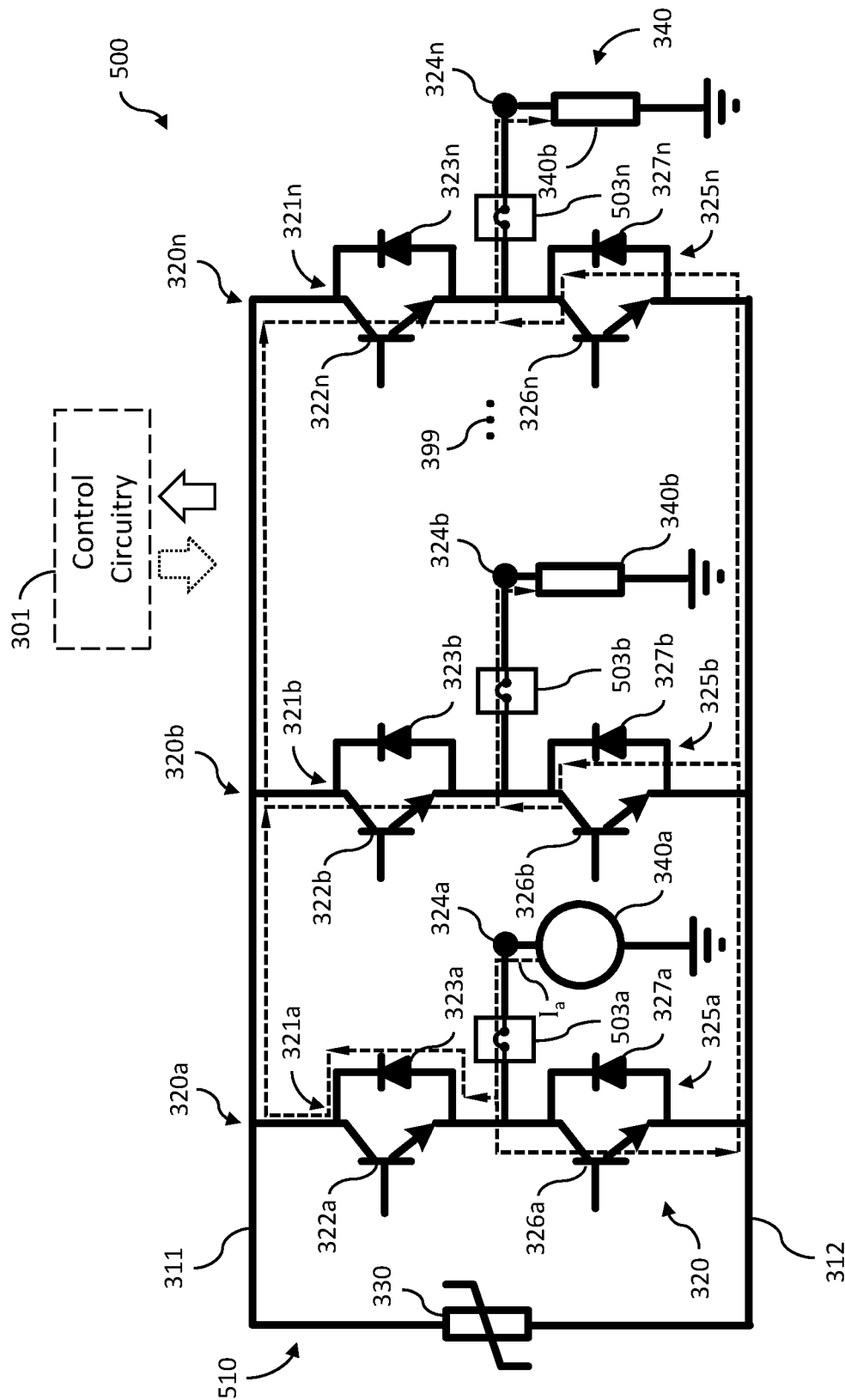
FIGS. 8A-8D are schematic diagrams illustrating an example fault clearing operation of the multi-port SSCB system of FIG. 7.
Figure 8B:
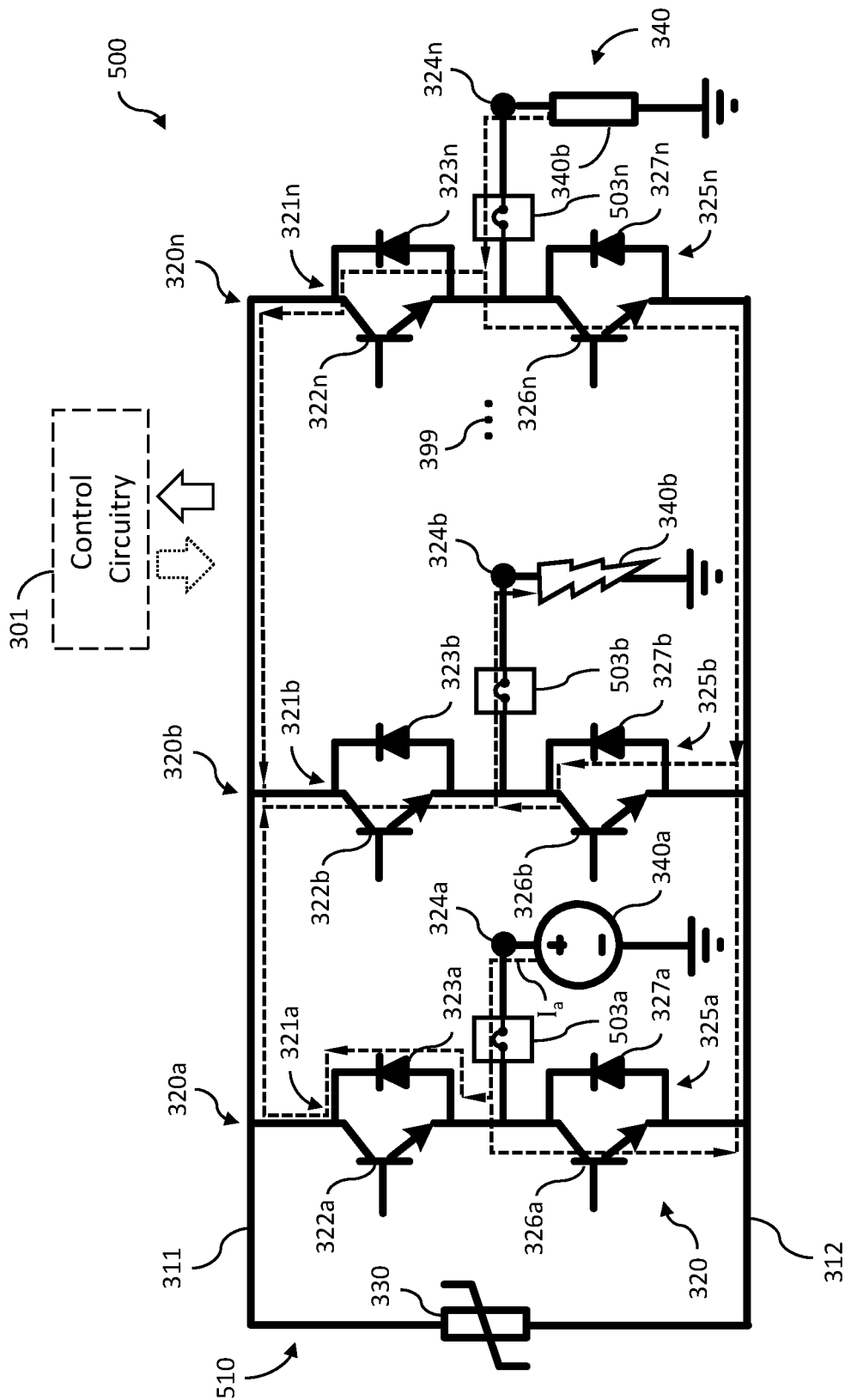
Figure 8C:
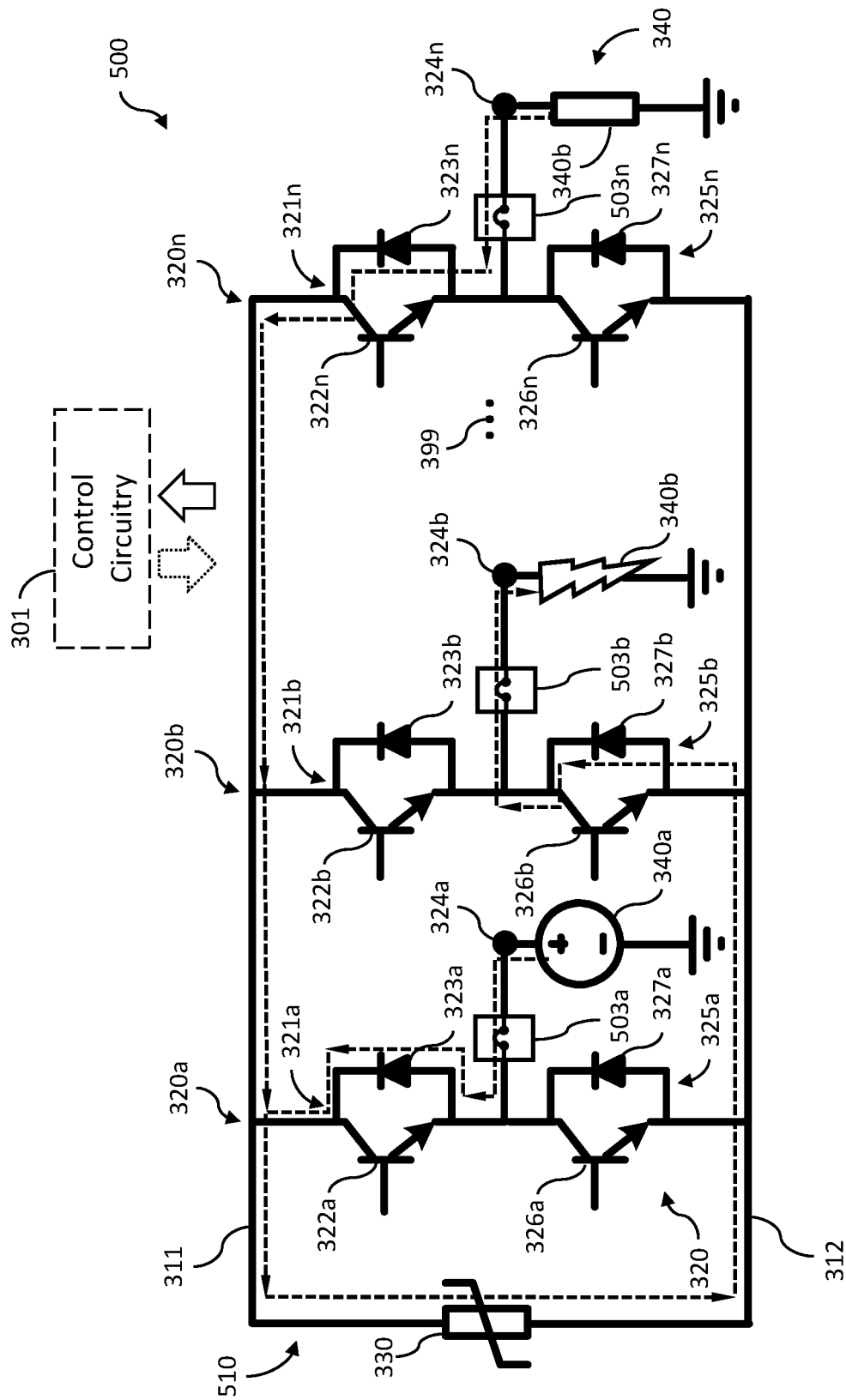
Figure 8D:
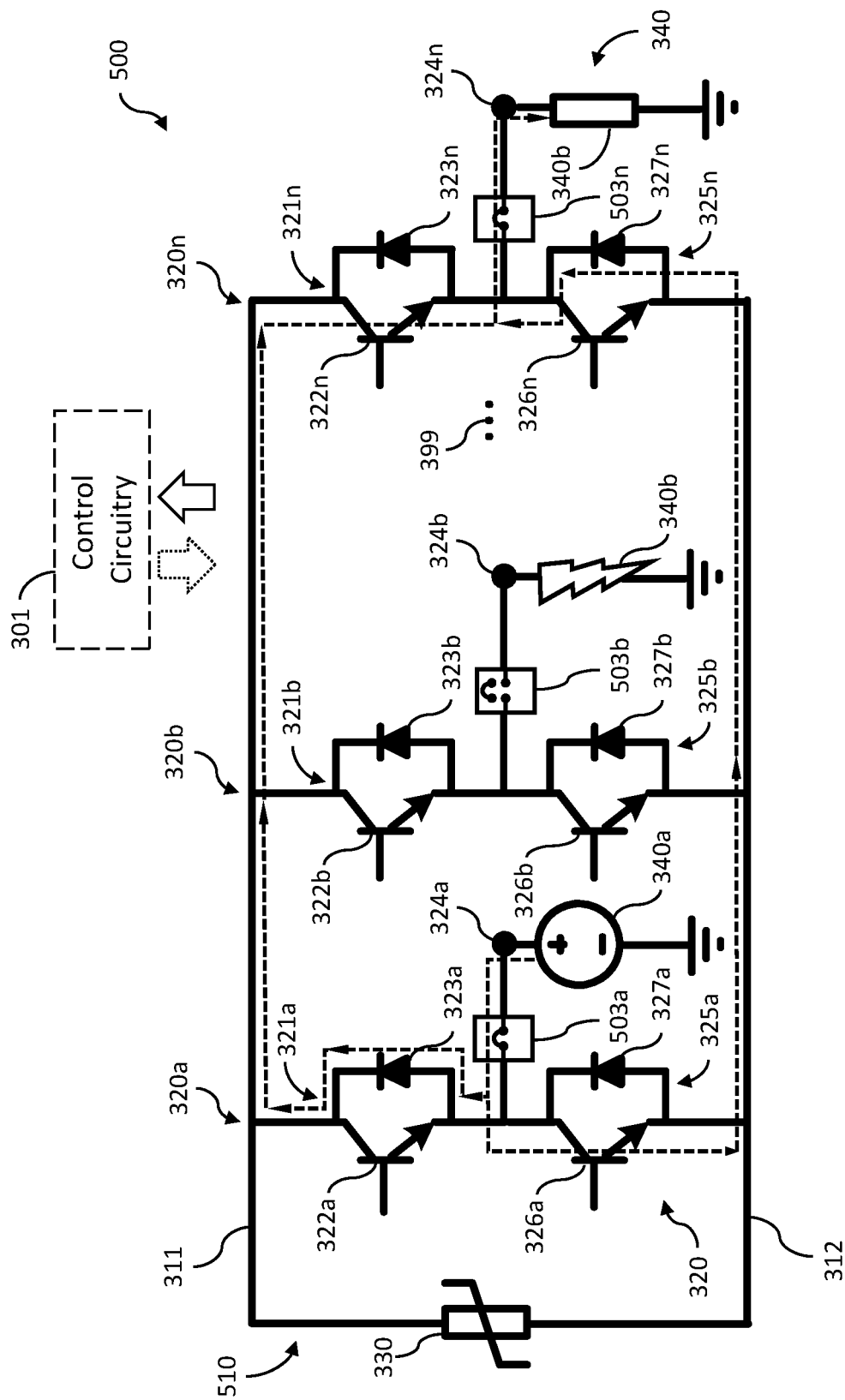

With reference to FIG. 7, there is illustrated an example system 500 comprising a multi-port SSCB system 510. The system 500 and the multi-port SSCB system 510 comprise a number of components and features that are the same as those of the system 300 and the multi-port SSCB system 310. Such components and features are labeled with the same reference numerals utilized in connection with the system 300 and the multi-port SSCB system 310 and it shall be understood that the description thereof applies mutatis mutandis to the system 500 and the multi-port SSCB system 510.

The multi-port SSCB system 510 also varies from the multi-port SSCB system 310 in a number of respects including a number of components and features labeled with different reference numerals from those utilized in connection with the system 300 and the multi-port SSCB system 310. For example, the multi-port SSCB system 510 comprises a plurality of mechanical switches 503 which are operable to selectably connect and disconnect the input/output ports of the multi-port SSCB system 510 form their respective breaker legs. In the illustrated embodiment, the plurality of mechanical switches includes mechanical switches 503a, 503b, 503n which are respectively provided between the port 324a and the other components of breaker leg 320a, between the port 324b and the other components of breaker leg 320b, and between the port 324n and the other components of breaker leg 320n. The plurality of mechanical switches 503 are operable to provide galvanic isolation when the breaker is in an off state and to isolate a port coupled with a source or load that is experiencing a fault so that other ports can operate in a normal conduction mode.

With reference to FIGS. 8A-8D, there is illustrated an example fault clearing operation which may be performed in connection with the system 500 and the multi-port SSCB system 510. FIGS. 8A-8D illustrate modes generally corresponding to the modes of FIGS. 5A-5D, respectively. In each of these modes, the corresponding description of FIGS. 5A-5D applies to FIGS. 8A-8D, respectively, and the mechanical switches 503a, 503b, 503n are in a closed or on state, except for the post-fault conduction mode of FIG. 8D. In this mode, the mechanical switch 503b is opened once the fault associate with the port 324b is isolated. The actively-controlled, solid-sate switching devices 326a, 322n of the power semiconductor devices 325a, 321n, respectively, are then turned on to restore two current paths from the port 324a to the port 324n and the attendant reduction in conductive losses associated therewith.

Figure 9:
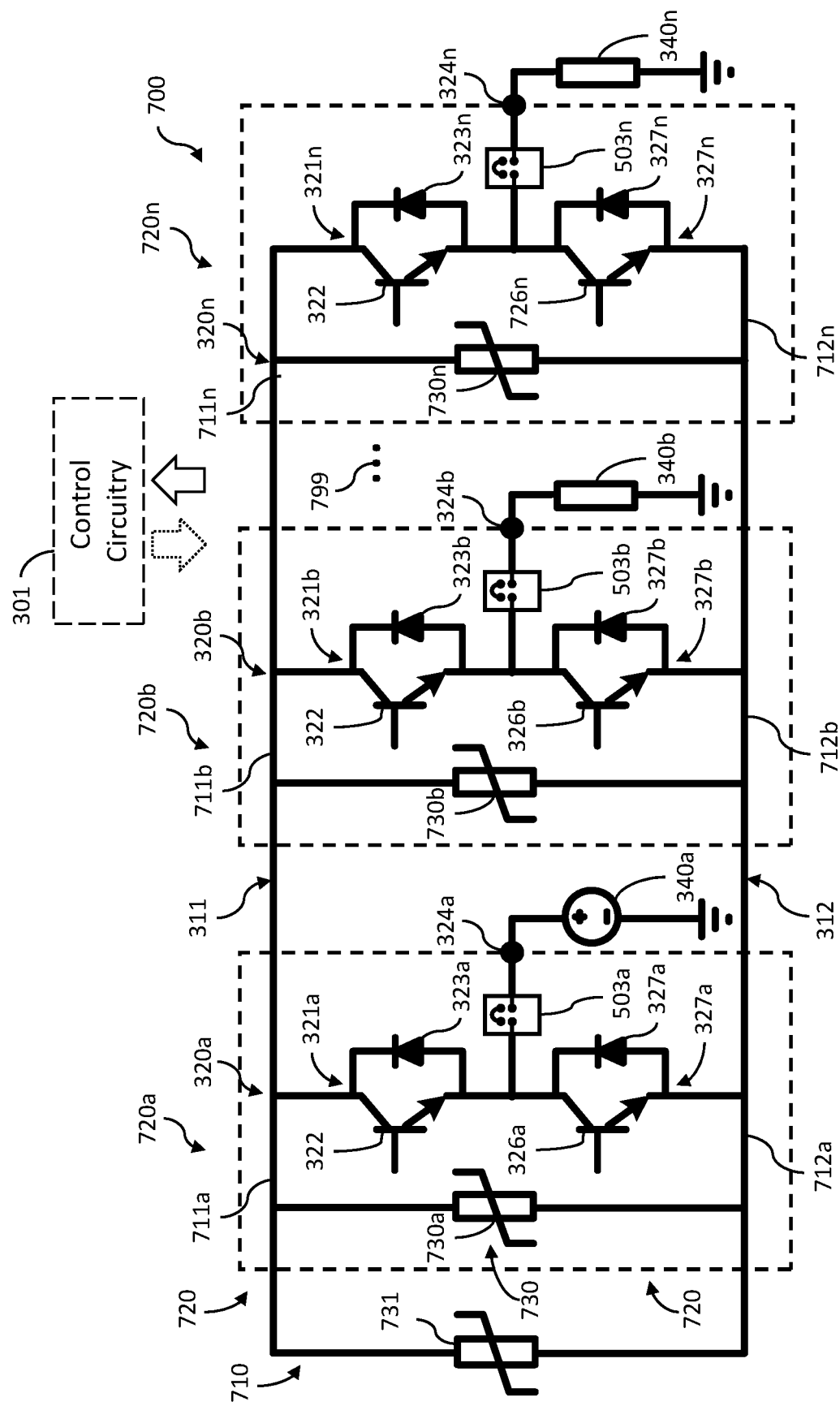
FIG. 9 is a schematic diagram illustrating an example multi-port SSCB system.

With reference to FIG. 9, there is illustrated an example system 700 comprising a multi-port SSCB system 710. The system 700 and the multi-port SSCB system 710 comprise a number of components and features that are the same as those of the system 300 and the multi-port SSCB system 310. Such components and features are labeled with the same reference numerals utilized in connection with the system 300 and the multi-port SSCB system 310 and it shall be understood that the description thereof applies mutatis mutandis to the system 700 and the multi-port SSCB system 710. The multi-port SSCB system 710 also includes the mechanical switches 503a, 503b, 503n as described in connection with the system 500, and the multi-port SSCB system 510, it being appreciated that some forms of the multi-port SSCB system 710 may omit the mechanical switches 503a, 503b, 503n.

The multi-port SSCB system 710 also varies from the multi-port SSCB system 310 in a number of respects. The multi-port SSCB system 710 is a modular system including a plurality of SSCB modules 720 each of which includes one of the plurality of breaker legs 320. In the illustrated example the plurality of SSCB modules 720 are depicted as comprising at least three SSCB modules 720a, 720b, 720n. In other embodiments, the plurality of breaker legs may comprise a different number of SSCB modules 720 comprising two or more SSCB modules. Each of the plurality of SSCB modules 720 may be provided in the form of a unitary breaker device The plurality of SSCB modules 720 includes a respective plurality of a surge suppressor 730. Thus, in the illustrated example, the SSCB modules 720a, 720b, 720n each include a respective surge suppressor 730a, 730b, 730n, a respective busses 711a, 711b, 711n of the overall first bus 311, and a respective busses 712a, 712b, 712n of the overall second bus 312. Each of the plurality of a surge suppressors 730 is coupled in parallel with a respective pair of power semiconductor devices 321a and 327a, 321b and 327b, 321n and 327n of the plurality of breaker legs 320. The plurality of surge suppressors 730 are configured and operable to clamp the peak spike voltage arising from the loop inductances of the SSCB modules 720a, 720b, 720n which are smaller than the loop inductances of the overall multi-port SSCB system 710, the multi-port SSCB system 510, or the multi-port SSCB system 310. A surge suppressor 731, which is larger than the plurality of surge suppressors 730 is configured and operable to absorb the remnant energy in the circuit in a manner similar to the surge suppressor 330.

It shall be appreciated that the plurality of SSCB modules 720 can be provided in a spaced-apart configuration coupled with wires cabling or other conductive structures which comprise of the bus 311 and the bus 312 intermediate the plurality of SSCB modules 720. The plurality of SSCB modules 720 can also be attached or directly coupled to one another to form an assemble unitary circuit breaker device.

Figure 10:
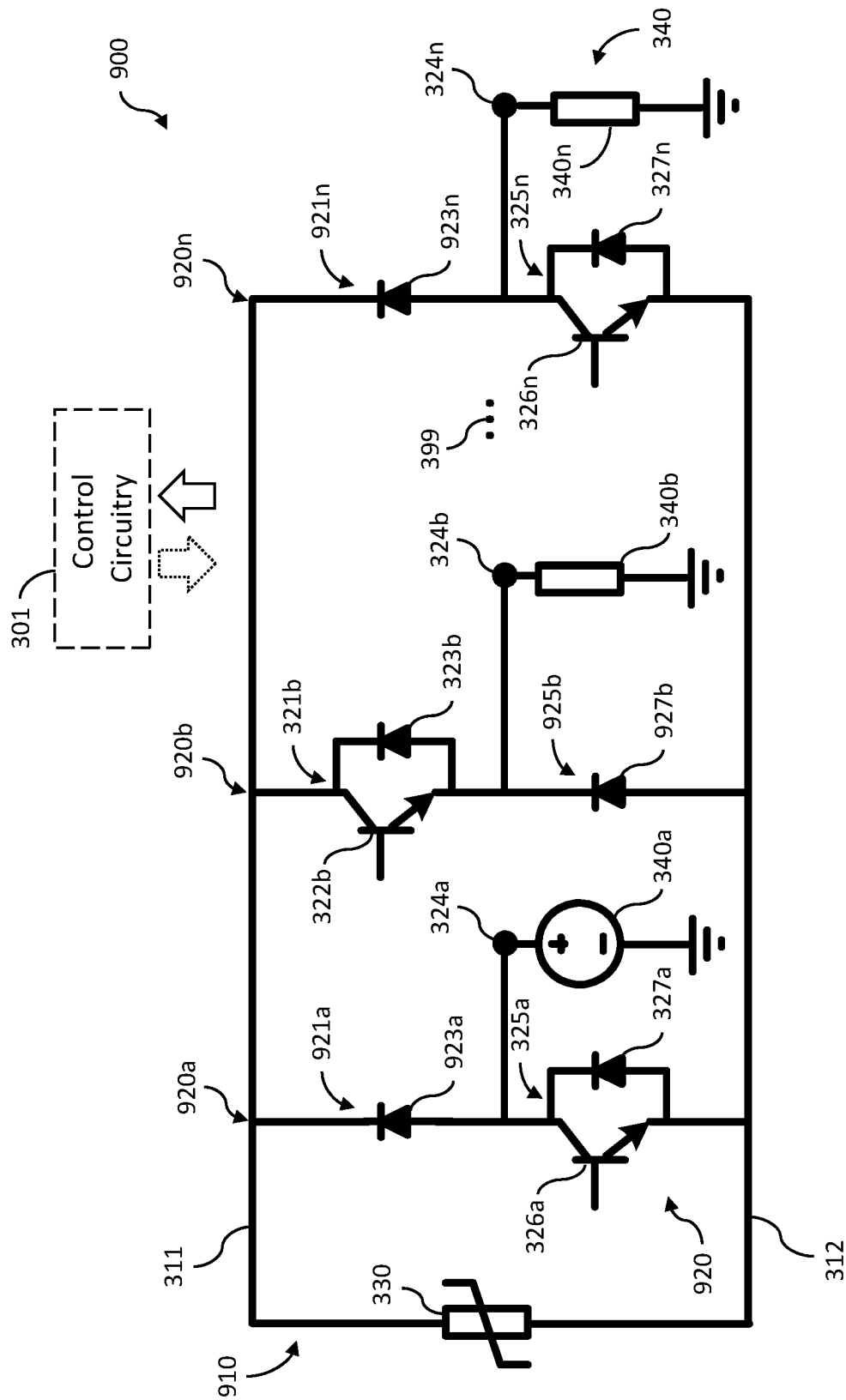
FIG. 10 is a schematic diagram illustrating an example multi-port SSCB system.

With reference to FIG. 10, there is illustrated an example system 900 comprising a multi-port SSCB system 910. The system 900 and the multi-port SSCB system 910 comprise a number of components and features that are the same as those of the system 300 and the multi-port SSCB system 310. Such components and features are labeled with the same reference numerals utilized in connection with the system 300 and the multi-port SSCB system 310 and it shall be understood that the description thereof applies mutatis mutandis to the system 900 and the multi-port SSCB system 910.

The multi-port SSCB system 910 also varies from the multi-port SSCB system 310 in a number of respects including a number of components and features labeled with different reference numerals from utilized in connection with the system 300 and the multi-port SSCB system 310. For example, the multi-port SSCB system 910 comprises a plurality of breaker legs 920 each of which respectively comprises an actively controlled switching device, a passive semiconductor device, and a port intermediate the actively controlled switching device and the passive semiconductor device.

In the illustrated example, the plurality of breaker legs 920 are depicted as comprising at least three breaker legs 920a, 920b, 920n. In other embodiments, the plurality of breaker legs may comprise a different number of breaker legs comprising two or more breaker legs. In other examples, the plurality of breaker legs may comprise a hybrid of at least one breaker leg comprising first and second actively controlled switching devices and a port intermediate the first and second actively-controlled, solid-state switching devices, and at least one breaker leg comprising an actively controlled switching device, a passive semiconductor device, and a port intermediate the actively controlled switching device and the passive semiconductor device.

The plurality of breaker legs 920 are conductively coupled with the first bus 311 and the second bus 312 in a parallel relationship with one another. Each of the plurality of breaker legs 920 comprises a first power semiconductor device coupled in series with a second power semiconductor device, one of which comprises an actively controlled switching device and the other of which comprises a passive semiconductor device. In the illustrated example, the breaker legs 920a, 920b, 920n comprise passive semiconductor devices 921*a*, 925*b*, 921*n* which are provided in the form of diodes 923*a*, 927*b*, 923*n*, respectively. In other embodiments, the breaker legs 920*a*, 920*b*, 920*n* may comprise other forms and types of passive semiconductor devices as will occur to one of skill in the art with the benefit of the present disclosure.

It shall be appreciated that the system 900 and the multi-port SSCB system 910, provide one example embodiment suitable for use with unidirectional power flow applications such as data centers and other applications in which power flow is provided in a single direction from one or more sources to one or more loads as will occur to one of skill in the art with the benefit of the present disclosure. Such applications also present an additional opportunity for reduced component count of actively controlled switching devices.

It shall be appreciated that a number of embodiments and forms of SSCB systems according to the present disclosure can offer unique advantages and improvements over conventional systems. While not essential, necessary, or limiting of the disclosure, a number of such unique advantages and improvements shall now be described for purposes of illustrating examples of the industrial applicability of various SSCB systems according to the present disclosure. SSCB systems according to the present disclosure can provide a reduced number of actively-controlled, solid-state switching devices, attendant lower conduction losses, and an attendant reduction in heatsink volume and mass relative to conventional systems. SSCB systems according to the present disclosure can provide a reduced number of voltage clamping components (e.g., MOVs) required to absorb the remnant energy and clamping the voltage, for example, a quantity reduction of N times, where N is the total number of ports in the power system. SSCB systems according to the present disclosure can provide a common heatsink for all power devices of the SSCB system which increases the heatsink utilization rate and reduces overall heatsink size. SSCB systems according to the present disclosure can provide unique fault clearing capabilities and unique post-fault-clearing restoration of load power. SSCB systems according to the present disclosure can also provide a number of additional and alternative unique advantages and improvements over conventional systems as shall be understood by a person of skill in the art with the benefit of the present disclosure.

A number of example embodiments shall now be further described. A first example embodiment is a multi-port solid-state circuit breaker system comprising: a first electrical power bus; a second electrical power bus; a plurality of breaker legs conductively coupled with the first electrical power bus and the second electrical power bus in parallel with one another, each of the plurality of breaker legs comprising a first power semiconductor device coupled in series with a second power semiconductor device and an input/output port intermediate the first power semiconductor device and the second power semiconductor device, at least one of the first semiconductor device and the second semiconductor device comprising an actively-controlled switching device; and a surge suppressor conductively coupled in parallel with the plurality of breaker legs.

A second example embodiment includes the features of the first example embodiment wherein the plurality of breaker legs comprise a first breaker leg including a first input/output port operatively coupled with a first power load, a second breaker leg including a second input/output port operatively coupled with a second power load, and a third breaker leg including a third input/output port operatively coupled with a power source.

A third example embodiment includes the features of the second example embodiment wherein the system is controllable to clear a fault in the first power load by the first power semiconductor device of the first breaker leg being turned off and the second power semiconductor device of the third breaker leg being turned off to interrupt respective first and second fault current paths and commutate fault current to a third fault current path through the surge suppressor.

A fourth example embodiment includes the features of the third example embodiment, wherein after clearing the fault in the first power load a load current flow path from the third port to the second port is restored.

A fifth example embodiment includes the features of the third example embodiment and comprises a controller configured to command the first power semiconductor device of the first breaker leg and the second power semiconductor device of the third breaker leg to turn off in response to detection of a fault current.

A sixth example embodiment includes the features of the third example embodiment, wherein the first breaker leg includes a mechanical switch configured to selectably connect and disconnect the first input/output port from the first power semiconductor device and the second power semiconductor device of the first breaker leg.

A seventh example embodiment includes the features of the sixth example embodiment, wherein, after clearing the fault, the mechanical switch of the first breaker leg is opened, and first and second load current flow paths from the third port to the second port are restored.

An eighth example embodiment includes the features of any of the first through seventh example embodiments, wherein the first power semiconductor device and the second power semiconductor device of each of the plurality of breaker legs comprise insulated gate bipolar transistor (IGBT) devices coupled in anti-parallel with a reverse blocking diode.

A ninth example embodiment includes the features of any of the first through eighth example embodiments, wherein the first semiconductor device and the second semiconductor device each comprise a respective actively-controlled switching device.

A tenth example embodiment includes the features of any of the first through eighth example embodiments, wherein only one of the first semiconductor device and the second semiconductor device comprises an actively-controlled switching device, and the other of the first semiconductor device and the second semiconductor device comprises a passive semiconductor device.

An eleventh example embodiment is a method comprising: operating a multi-port solid-state circuit breaker in a first mode, the multi-port solid-state circuit breaker including a first electrical power bus, a second electrical power bus, a plurality of breaker legs conductively coupled with the first electrical power bus and the second electrical power bus in parallel with one another, and a surge suppressor conductively coupled in parallel with the plurality of breaker legs, the first mode including: supplying current from a first input/output port of a first one of the plurality of legs to a second input/output port of a second one of the plurality of legs through a first current flow path including only one first actively-controlled, solid-state switching device, and supplying current from the first input/output port of the first one of the plurality of legs to the second input/output port of the second one of the plurality of legs through a second current flow path including only one second actively-controlled, solid-state switching device.

A twelfth example embodiment includes the features of the eleventh example embodiment and comprises operating the multi-port solid-state circuit breaker in a second mode in response to a fault current of the second input/output port, the second mode comprising: turning off the first actively-controlled, solid-state switching device, turning off the second actively-controlled, solid-state switching device, and commutating a fault current to the surge suppressor.

A thirteenth example embodiment includes the features of the twelfth example embodiment and comprises: in response to commutating the fault current to the surge suppressor, clamping a voltage across the first electrical power bus and the second electrical power bus and dissipating energy of the fault current with the surge suppressor.

A fourteenth example embodiment includes the features of the thirteenth example embodiment and comprises: after commutating the fault current to the surge suppressor, supplying current from the first input/output port of the first one of the plurality of legs to the second input/output port of the second one of the plurality of legs through one of the first current flow path and the second current flow path.

A fifteenth example embodiment includes the features of the thirteenth example embodiment and comprises: after commutating the fault current to the surge suppressor, supplying current from the first input/output port of the first one of the plurality of legs to the second input/output port of the second one of the plurality of legs through both of the first current flow path and the second current flow path.

A sixteenth example embodiment is a multi-port solid-state circuit breaker apparatus comprising: a plurality of breaker legs operatively coupled in parallel with one another between a first electrical power bus and a second electrical power bus; and a surge suppressor operatively coupled in parallel with the plurality of breaker legs; wherein each of the plurality of breaker legs includes an input/output port, a first current flow path from the input/output port to the first electrical power bus, a second current flow path from the input/output port to the second electrical power bus, and an actively-controlled, solid-state switching device configured to selectably establish and interrupt the first current first flow path.

A seventeenth example embodiment includes the features of the sixteenth example embodiment wherein, during a fault condition of a first one of the plurality of breaker legs, interruption of the first current flow path of a second one of the plurality of breaker legs by the solid-state switching device of the second one of the plurality of breaker legs and interruption of the first current flow path of a third one of the plurality of breaker legs by the solid-state switching device of the third one of the plurality of breaker legs commutates a fault current to the surge suppressor.

An eighteenth example embodiment includes the features of the sixteenth example embodiment, wherein in response to the fault current the surge suppressor is configured to establish a clamping voltage across the first electrical power bus and the second electrical power bus in response to the fault current and to passively dissipate energy of the fault current.

A nineteenth example embodiment includes the features of the sixteenth example embodiment wherein, during a fault condition of a load coupled with the second one of the plurality of breaker legs, interruption of the first current flow path of the first one of the plurality of breaker legs by the solid-state switching device of the first one of the plurality of breaker legs and interruption of the first current flow path of a third one of the plurality of breaker legs by the solid-state switching device of the third one of the plurality of breaker legs commutates a fault current to the surge suppressor.

A twentieth example embodiment includes the features of any of the sixteenth through nineteenth example embodiments wherein the surge suppressor comprises a metal oxide varistor.

A twentieth example embodiment includes the features of any of the sixteenth through nineteenth example embodiments wherein, in at least a first one of the plurality of legs, the first current flow path extends between the input/output port of the first one of the plurality of legs and the input/output port of a second one first one of the plurality of legs, and the actively-controlled, solid-state switching device of the first one of the plurality of legs comprises the only actively-controlled, solid-state switching device in the first current flow path.

While example embodiments of the disclosure have been illustrated and described in detail in the drawings and foregoing description, the same is to be considered as illustrative and not restrictive in character, it being understood that only certain example embodiments have been shown and described and that all changes and modifications that come within the spirit of the claimed inventions are desired to be protected. It should be understood that while the use of words such as preferable, preferably, preferred, or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A multi-port solid-state circuit breaker system comprising:
   a first electrical power bus;
   a second electrical power bus;
   a plurality of breaker legs conductively coupled with the first electrical power bus and the second electrical power bus in parallel with one another, each of the plurality of breaker legs comprising a first power semiconductor device coupled in series with a second power semiconductor device and an input/output port intermediate the first power semiconductor device and the second power semiconductor device, at least one of the first semiconductor device and the second semiconductor device comprising an actively-controlled switching device; and
   a surge suppressor conductively coupled in parallel with the plurality of breaker legs.

2. The multi-port solid-state circuit breaker system of claim 1, wherein the plurality of breaker legs comprise a first breaker leg including a first input/output port operatively coupled with a first power load, a second breaker leg including a second input/output port operatively coupled with a second power load, and a third breaker leg including a third input/output port operatively coupled with a power source.

3. The multi-port solid-state circuit breaker system of claim 2, wherein the system is controllable to clear a fault in the first power load by the first power semiconductor device of the first breaker leg being turned off and the second power semiconductor device of the third breaker leg being turned off to interrupt respective first and second fault current paths and commutate fault current to a third fault current path through the surge suppressor.

4. The multi-port solid-state circuit breaker system of claim 3, wherein after clearing the fault in the first power load a load current flow path from the third port to the second port is restored.

5. The multi-port solid-state circuit breaker system of claim 3, comprising: a controller configured to command the first power semiconductor device of the first breaker leg and the second power semiconductor device of the third breaker leg to turn off in response to detection of a fault current.

6. The multi-port solid-state circuit breaker system of claim 3, wherein the first breaker leg includes a mechanical switch configured to selectably connect and disconnect the first input/output port from the first power semiconductor device and the second power semiconductor device of the first breaker leg.

7. The multi-port solid-state circuit breaker system of claim 6, wherein, after clearing the fault, the mechanical switch of the first breaker leg is opened, and first and second load current flow paths from the third port to the second port are restored.

8. The multi-port solid-state circuit breaker system of claim 1, wherein the first power semiconductor device and the second power semiconductor device of each of the plurality of breaker legs comprise insulated gate bipolar transistor (IGBT) devices coupled in anti-parallel with a reverse blocking diode.

9. The multi-port solid-state circuit breaker system of claim 1, wherein the first semiconductor device and the second semiconductor device each comprise a respective actively-controlled switching device.

10. The multi-port solid-state circuit breaker system of claim 1, wherein only one of the first semiconductor device and the second semiconductor device comprises an actively-controlled switching device, and the other of the first semiconductor device and the second semiconductor device comprises a passive semiconductor device.

11. A method comprising:
operating a multi-port solid-state circuit breaker in a first mode, the multi-port solid-state circuit breaker including a first electrical power bus, a second electrical power bus, a plurality of breaker legs conductively coupled with the first electrical power bus and the second electrical power bus in parallel with one another, and a surge suppressor conductively coupled in parallel with the plurality of breaker legs, the first mode including:
supplying current from a first input/output port of a first one of the plurality of legs to a second input/output port of a second one of the plurality of legs through a first current flow path including only one first actively-controlled, solid-state switching device, and
supplying current from the first input/output port of the first one of the plurality of legs to the second input/output port of the second one of the plurality of legs through a second current flow path including only one second actively-controlled, solid-state switching device.

12. The method of claim 11 comprising:
operating the multi-port solid-state circuit breaker in a second mode in response to a fault current of the second input/output port, the second mode comprising:
turning off the first actively-controlled, solid-state switching device,
turning off the second actively-controlled, solid-state switching device, and
commutating a fault current to the surge suppressor.

13. The method of claim 12, comprising: in response to commutating the fault current to the surge suppressor, clamping a voltage across the first electrical power bus and the second electrical power bus and dissipating energy of the fault current with the surge suppressor.

14. The method of claim 13, comprising: after commutating the fault current to the surge suppressor, supplying current from the first input/output port of the first one of the plurality of legs to the second input/output port of the second one of the plurality of legs through one of the first current flow path and the second current flow path.

15. The method of claim 13, comprising: after commutating the fault current to the surge suppressor, supplying current from the first input/output port of the first one of the plurality of legs to the second input/output port of the second one of the plurality of legs through both of the first current flow path and the second current flow path.

16. A multi-port solid-state circuit breaker apparatus comprising:
a plurality of breaker legs operatively coupled in parallel with one another between a first electrical power bus and a second electrical power bus; and
a surge suppressor operatively coupled in parallel with the plurality of breaker legs;
wherein each of the plurality of breaker legs includes an input/output port, a first current flow path from the input/output port to the first electrical power bus, a second current flow path from the input/output port to the second electrical power bus, and an actively-controlled, solid-state switching device configured to selectably establish and interrupt the first current first flow path.

17. The multi-port solid-state circuit breaker apparatus of claim 16, wherein, during a fault condition of a first one of the plurality of breaker legs, interruption of the first current flow path of a second one of the plurality of breaker legs by the solid-state switching device of the second one of the plurality of breaker legs and interruption of the first current flow path of a third one of the plurality of breaker legs by the solid-state switching device of the third one of the plurality of breaker legs commutates a fault current to the surge suppressor.

18. The multi-port solid-state circuit breaker apparatus of claim 16, wherein in response to the fault current the surge suppressor is configured to establish a clamping voltage across the first electrical power bus and the second electrical power bus in response to the fault current and to passively dissipate energy of the fault current.

19. The multi-port solid-state circuit breaker apparatus of claim 16, wherein, during a fault condition of a load coupled with the second one of the plurality of breaker legs, interruption of the first current flow path of the first one of the plurality of breaker legs by the solid-state switching device of the first one of the plurality of breaker legs and interruption of the first current flow path of a third one of the plurality of breaker legs by the solid-state switching device of the third one of the plurality of breaker legs commutates a fault current to the surge suppressor.

20. The multi-port solid-state circuit breaker apparatus of claim 16, wherein, the surge suppressor comprises a metal oxide varistor.

21. The multi-port solid-state circuit breaker apparatus of claim 16, wherein, in at least a first one of the plurality of legs, the first current flow path extends between the input/output port of the first one of the plurality of legs and the input/output port of a second one first one of the plurality of legs, and the actively-controlled, solid-state switching device of the first one of the plurality of legs comprises the only actively-controlled, solid-state switching device in the first current flow path.

\* \* \* \* \*